(12) United States Patent
Yasuda et al.

(10) Patent No.: US 6,661,415 B1
(45) Date of Patent: Dec. 9, 2003

(54) LIQUID CRYSTAL DRIVER AND OPTICAL HEAD FOR TILT CORRECTION

(75) Inventors: Katsuhiko Yasuda, Neyagawa (JP); Hidenori Wada, Uji (JP); Daisuke Ogata, Amagaski (JP); Kanji Wakabayashi, Kyoto (JP); Naoya Hotta, Sagamihara (JP); Yoshihiro Ikawa, Higashiosaka (JP); Yoshihiro Kanda, Osaka-fu (JP); Masahiro Inata, Itami (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 390 days.

(21) Appl. No.: 09/598,972

(22) Filed: Jun. 22, 2000

(30) Foreign Application Priority Data

Jun. 22, 1999 (JP) .............................. 11-175319
Sep. 29, 1999 (JP) .............................. 11-275667

(51) Int. Cl.$^7$ .................................. G09G 5/00
(52) U.S. Cl. ................. 345/213; 345/211; 345/204; 345/52; 345/53; 345/87; 345/94; 369/44.32; 369/53.19; 369/112.02
(58) Field of Search .................. 345/43, 52–54, 345/204, 206, 211–213, 87, 93–95, 100, 695; 369/112.02, 44.32, 53.19

(56) References Cited

U.S. PATENT DOCUMENTS

| | | | | | |
|---|---|---|---|---|---|
| 5,404,150 A | * | 4/1995 | Murata | ...................... | 345/211 |
| 5,517,212 A | * | 5/1996 | Inoue | ...................... | 345/211 |
| 6,028,598 A | * | 2/2000 | Suyama et al. | ............. | 345/211 |
| 6,078,556 A | * | 6/2000 | Furukawa et al. | ........ | 369/53.19 |
| 6,118,439 A | * | 9/2000 | Ho et al. | ................... | 345/211 |
| 6,137,754 A | * | 10/2000 | Furukawa et al. | ........ | 369/44.32 |
| 6,198,465 B1 | | 3/2001 | Furukawa et al. | | |
| 6,225,992 B1 | * | 5/2001 | Hsu et al. | ................. | 345/211 |
| 6,256,003 B1 | * | 7/2001 | Tsuchiya et al. | ............. | 345/87 |
| 6,304,255 B1 | * | 10/2001 | Suzuki et al. | ............... | 345/211 |

FOREIGN PATENT DOCUMENTS

| | | |
|---|---|---|
| JP | 5-53089 | 3/1993 |
| JP | 7-191300 | 7/1995 |
| JP | 10-302285 | 11/1998 |
| JP | 10-334491 | 12/1998 |
| JP | 11-110802 | 4/1999 |
| JP | 2000-90479 | 3/2000 |

* cited by examiner

*Primary Examiner*—Richard Hjerpe
*Assistant Examiner*—Henry N. Tran
(74) *Attorney, Agent, or Firm*—Wenderoth, Lind & Ponack, L.L.P.

(57) ABSTRACT

Tilt which is inclination of a normal of optical disk relative to optical axis of optical head is corrected with a liquid crystal element. In a driver for the liquid crystal element, a periodic waveform generator generates periodic waveform and an inverting element inverts the periodic waveform. The periodic waveform and the inverted waveform are connected to two ends of a potential divider which provides partial voltages. The periodic waveform is connected to a common electrode of the liquid crystal element, and the partial voltages of the potential divider are connected to electrodes opposing the common electrode. A structure of a driver circuit for each direction is simple. Tilt in a plurality of directions can be performed independently of each other. Spherical aberration is also corrected. When the liquid crystal element is mounted to a fixed component, deterioration due to jitters is reduced.

20 Claims, 23 Drawing Sheets

θ=90°, α=0°

θ=90°, α=45°

θ=90°, α=90°

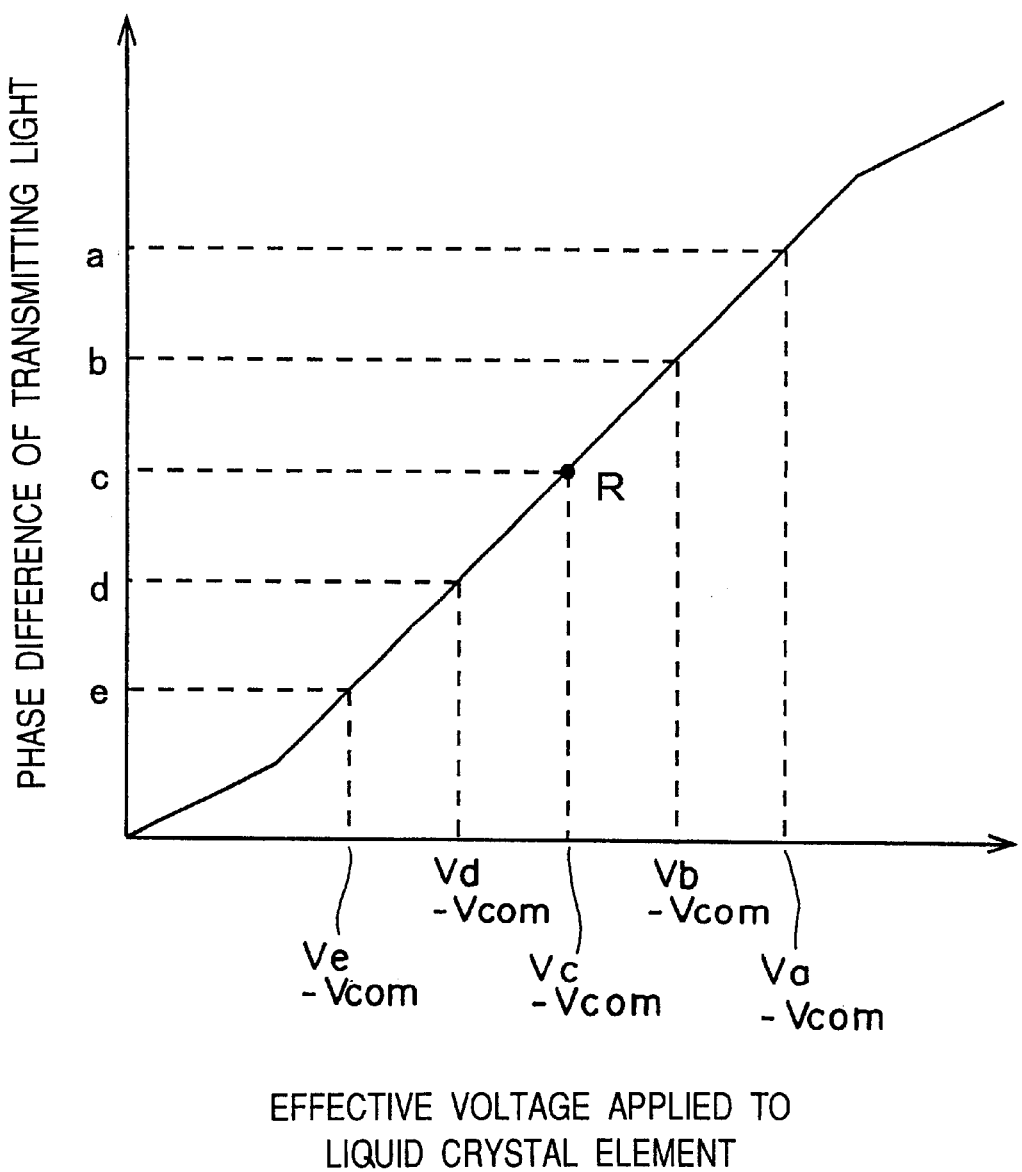

LIQUID CRYSTAL DRIVER AND OPTICAL HEAD FOR TILT CORRECTION

BACKGROUND OF THE INVENTION

1. Field of the Invention

The present invention relates to a liquid crystal driver used for correcting tilt of an optical head used in an optical disk drive.

2. Description of Prior Art

Recently, it is proposed to correct tilt in an optical head in an optical disk drive with a liquid crystal element in order to correct aberration (Japanese Patent laid open Publications 10-79135/1998 and 11-3531/1999). The tilt is an inclination of the optical axis of an optical head relative to an optical disk. Electrodes in the liquid crystal element are provided as a plurality of divided areas of predetermined shapes, and voltages applied to the areas are controlled for tilt correction by changing the phase difference of a transmitting laser beam. Spherical aberration of object lens is a problem for higher density recording of optical disk when a short wavelength laser is used for a lens of high numerical aperture (NA). Spherical aberration is also corrected with the liquid crystal element.

When tilt correction is performed only in one direction, the liquid crystal element has divided areas of generally long areas and the voltages applied to the areas are controlled. When tilt correction is performed in two directions, the liquid crystal element has divided areas of generally fan-like shapes extending in two directions, and a central area around the optical axis is provided as a common area. In this case, the voltages applied to the areas are controlled similarly to the correction in one direction.

In order to apply voltages, an operational amplifier or a pulse width modulation circuit is used generally. When tilt correction is performed in one direction and in two directions, as mentioned above, a driver circuit is provided for each of the areas in the liquid crystal element.

As to the driver circuit, it is necessary to provide a driver circuit for each of the divided areas in the liquid crystal element. Then, the circuit scale of the driver circuit becomes large. Further, a large number of connections for driving the liquid crystal element are needed in an interface between the optical head with the liquid crystal element and the circuit board.

Further, when tilt correction is performed in two or more directions, it is desirable to correct the tilt for each direction independently. However, it is troublesome to determine voltages applied to the areas except the common area for each direction by taking into account the voltage applied to the common area. Recently a digital signal processor is used to determine the applied voltages, and the number of the steps becomes large in the software processing in the digital signal processor.

In a prior art optical head, a liquid crystal element is mounted not on an actuator which is a moving component, but on a fixed component. This is adopted in order to improve sensitivity on focusing and tracking by making the optical head compact and by using a light-weight actuator. Tilt caused by inclination of the object lens in radial and tangential directions are corrected. However, when the object lens is moved in the radial direction, it is a problem that the optical axis of the object lens is shifted relative to the liquid crystal pattern, so that performance of aberration correction is deteriorated.

SUMMARY OF THE INVENTION

An object of the present invention is to provide a liquid crystal driver which performs tilt correction in a plurality of directions independently of each other.

Another object of the present invention is to provide a liquid crystal driver which corrects spherical aberration of the object lens.

A further object of the present invention is to provide an optical head having a fixed liquid crystal element which performs tilt correction in the radial and tangential directions and improves aberration correction performance when the object lens is moved in the radial direction.

In one aspect of the invention, in a liquid crystal driver, a periodic waveform generator generates a periodic waveform signal, a phase shifter receives the periodic waveform signal from the periodic waveform generator and shifts phase thereof according to an instructed value, and an inverting element inverts an output signal of the phase shifter. A potential divider comprises a plurality of resistors connected in series, and the output signal of the phase shifter and the output signal of the inverting element are connected to two ends of the potential divider. A liquid crystal element comprises electrodes of a plurality of areas and a common electrode opposing the electrodes, wherein the common electrode is connected to the periodic waveform signal outputted by the periodic wave generator and the plurality of areas are connected to output voltages of the potential divider. Thus, tilt correction is performed with a simple structure of liquid crystal driver. When tilt is corrected in a plurality of directions, the liquid crystal driver may have a plurality of sets of the phase shifter, the inverting element and the potential divider for each direction.

In another aspect of the invention, a liquid crystal driver has a plurality of phase shifters, inverting elements, and potential drivers. A liquid crystal element comprises electrodes of a plurality of areas extending in the plurality of directions and a common electrode opposing the electrodes. The common electrode is connected to the periodic waveform signal outputted by the periodic wave generator, and the plurality of areas are connected to output voltages of the plurality of potential dividers.

In a further aspect of the invention, an optical head comprises a light source, an object lens for converging a light beam emitted by the light source, and a liquid crystal element arranged between the light source and the object lens. The liquid crystal element comprises electrodes of a plurality of areas in a plane perpendicular to an optical axis of a light beam reflected from an optical disk and a common electrode opposing the electrodes via a liquid crystal layer. The electrodes comprise a first electrode group used for correcting the light beam transmitting when no shift of the object lens occurs relative to the optical axis, an at least one second electrode provided adjacent to the first electrode groups in a first direction along which the object lens is shifted, and at least one third electrode provided adjacent to the first electrode groups in a second direction opposite to the first direction.

An advantage of the present invention is that a liquid crystal driver has a simple structure of a driver circuit for each direction.

Another advantage of the present invention is that tilt correction in a plurality of directions can be performed independently of each other without interference between each other.

A further advantage of the present invention is that the optical head performs tilt correction more precisely with high reliability.

BRIEF DESCRIPTION OF THE DRAWINGS

These and other objects and features of the present invention will become clear from the following description taken in conjunction with the preferred embodiments thereof with reference to the accompanying drawings, and in which:

FIG. 19 is a diagram of phase difference of transmitting light plotted against effective voltage applied to the liquid crystal element;

DESCRIPTION OF THE PREFERRED EMBODIMENTS

Figure 1:
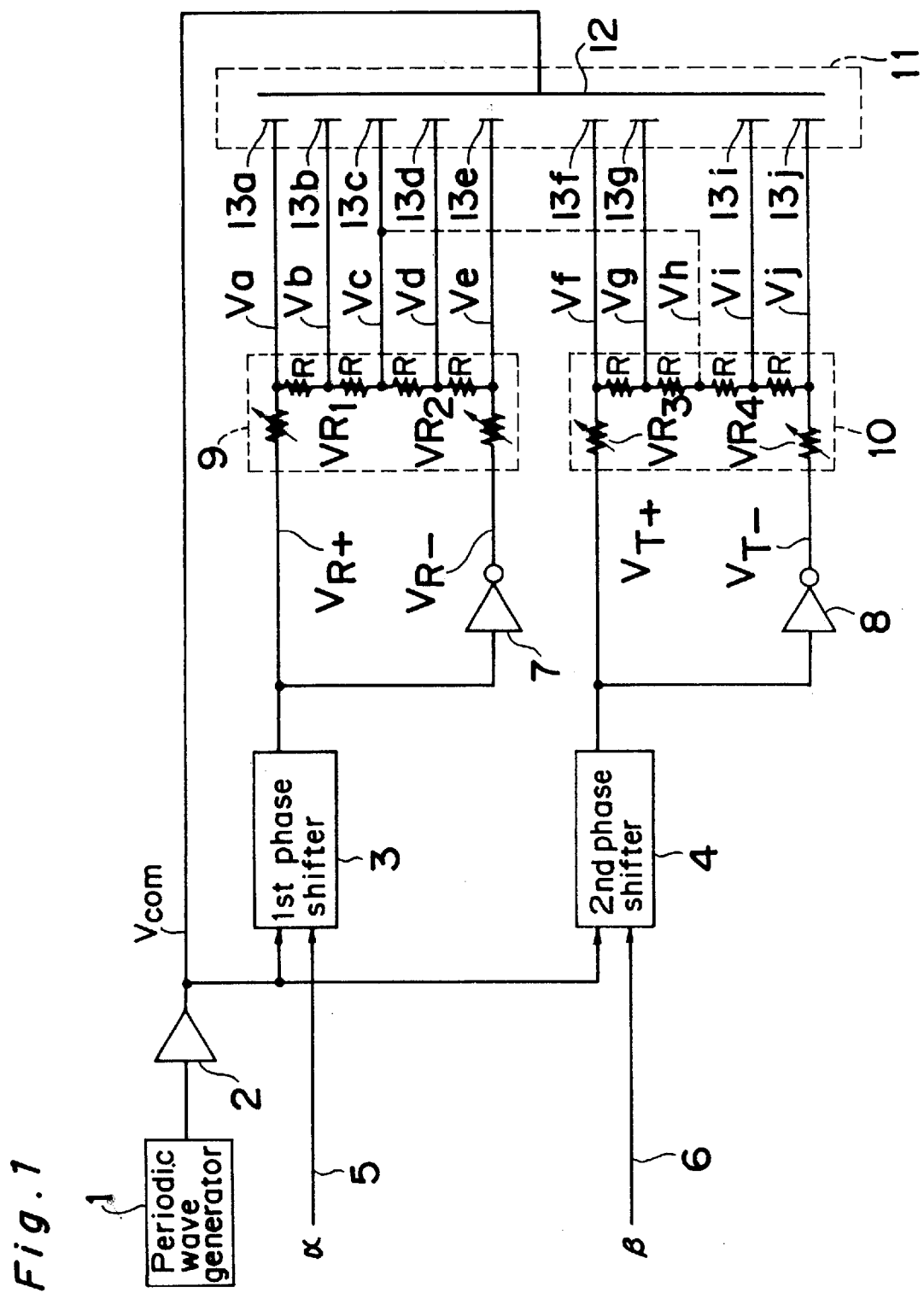
FIG. 1 is a block diagram on an electrical circuit of a liquid crystal driver.

Referring now to the drawings, wherein like reference characters designate like or corresponding parts throughout the several views, FIG. 1 shows a block diagram of an electrical circuit of a liquid crystal driver according to a first embodiment of the invention. A periodic waveform generator 1 generates a periodic signal of a sine wave, square wave or the like. An amplitude controller 2 controls the amplitude of the waveform generated by the periodic waveform generator 1 to output a periodic signal $V_{com}$. A first phase shifter 3 shifts the phase of signal $V_{com}$ from the amplitude controller 2 according to radial tilt instruction 5 to send signal $V_{R+}$, and a second phase shifter 4 shifts the phase of signal $V_{com}$ from the amplitude controller 2 according to tangential tilt instruction 6 to send signal $V_{T+}$. The radial tilt instruction 5 designates an instructed value on radial tilt correction provided by a tilt servo device (not shown), and tangential tilt instruction 6 is an instructed value on tangential tilt correction provided by the tilt servo device. The phase shifters 3, 4 are, for example, delay elements for analog signals and shift registers for digital signals.

A first inverting element 7 inverts the output signal $V_{R+}$ from the first phase shifter 3 to send signal $V_{R-}$, and a second inverting element 8 inverts the output signal $V_{T+}$ from the second phase shifter 4 to send signal $V_{T-}$. The signal $V_{R+}$ from the first phase shifter 3 and the signal $V_{R-}$ from the first inverting element 7 are connected to two ends of a first potential divider 9, while the signal $V_{T+}$ from the second phase shifter 4 and the signal $V_{T-}$ from the second inverting element 8 are connected to two ends of a second potential divider 10. The inverting elements 7, 8 are, for example, inverters for digital signals and inverting circuits for analog signals.

The first potential divider 9 comprises four resistors of resistance R connected in series and variable resistors $VR_1$ and $VR_2$ connected in series to the two ends of the four resistors connected in series. The first potential divider 9 is connected to the first phase shifter 3 so that signal $V_{R+}$ is applied to the variable resistance $VR_1$, and it is connected to the first inverting element 7 so that signal $V_{R-}$ is applied to the variable resistance $VR_2$. Then, the first potential divider 9 provides divided voltages Va, Vb, Vc, Vd and Ve from the side of the variable resistor $VR_1$. Similarly, the second potential divider 10 comprises four resistors of resistance R connected in series and variable resistors $VR_3$ and $VR_4$ connected in series to the two ends of the four resistors connected in series. The second potential divider 10 is connected to the second phase shifter 4 so that signal $V_{T+}$ is applied to the variable resistance $VR_3$ and is connected to the second inverting element 8 so that signal $V_{T-}$ is applied to the variable resistance $VR_4$. Then, the second potential divider 10 provides divided voltages Vf, Vg, Vh, Vi and Vj from the side of the variable resistor $VR_3$.

A liquid crystal element 11 has a common electrode 12 and electrodes 13 made of a plurality of divided areas. The electrodes 13 comprises nine electrodes 13a, 13b, 13c, 13d, 13e, 13f, 13g, 13i and 13j in correspondence to the divided voltages Va, Vb, Vc, Vd, Ve, Vf, Vg, Vi, Vj. (There is no electrode in correspondence to voltage Vh.) That is, the divided voltages Va to Vj are connected to electrodes 13a to 13j, except the voltage Vh. The output $V_{com}$ of the amplitude controller 2 is connected to the common electrode 12 of the liquid crystal element 11. A line (dashed line) connecting the lines of Vc and Vh will be explained later.

Figure 2A:
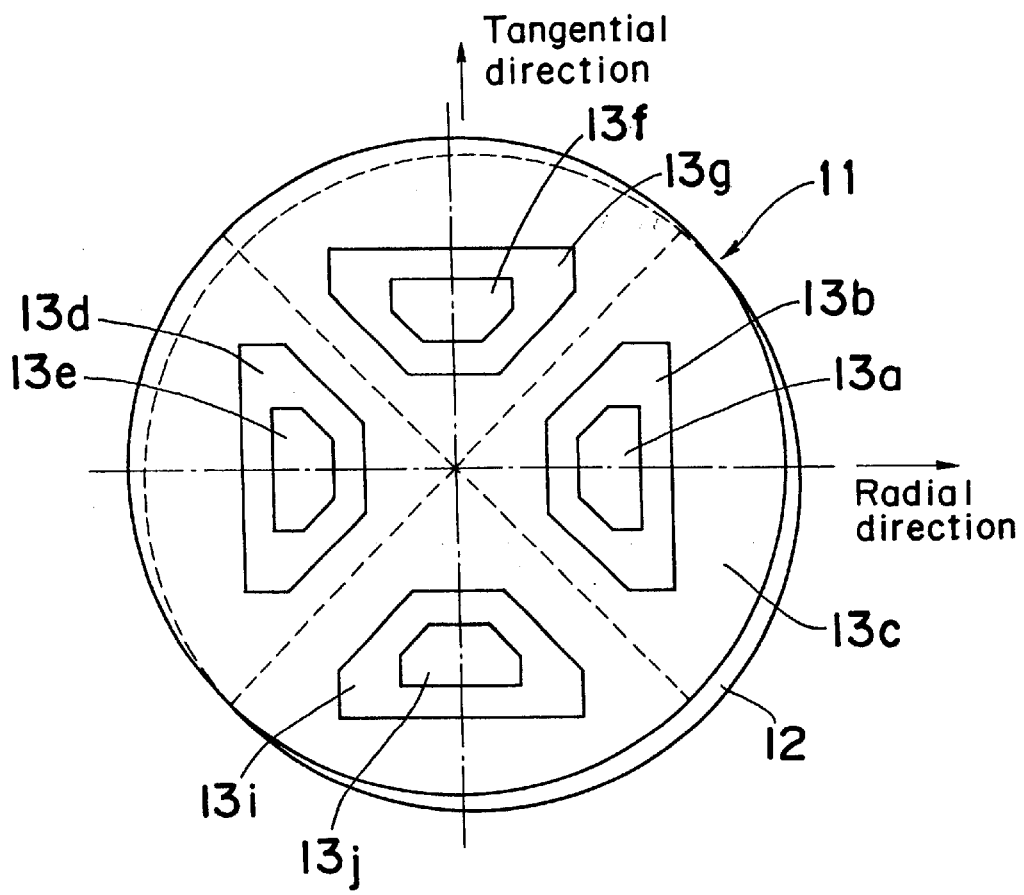
FIGS. 2A and 2B are a plan view and a sectional view of a liquid crystal element used in the liquid crystal driver.

Next, a structure of the liquid crystal element 11 is explained with reference to FIGS. 2A and 2B. FIG. 2A shows the liquid crystal element 11 in a plane wherein it is divided into a plurality of areas. The right side in FIG. 2A corresponds to radial direction of an optical disk (not shown), and the top side in FIG. 2A corresponds to tangential direction of tracks in the optical disk.

In FIG. 2A, the electrodes divided into the nine areas are provided in the front side, and a common electrode 12 opposing the areas is provided in the back side. Fan-like electrodes are arranged to extend in each of radial and tangential directions. The electrode 13a is located in the electrode 13b extending in radial direction, the electrode 13e is located in the electrode 13d extending in radial direction, the electrode 13f is located in the electrode 13g extending in tangential direction, and the electrode 13j is located in the electrode 13i extending in tangential direction. The electrodes 13a, 13b, 13d and 13e are used for radial tilt correction, while the electrodes 13f, 13g, 13i and 13j are used for tangential tilt correction. Further, the electrode 13c is used commonly for tilt correction in the two directions.

Figure 2B:
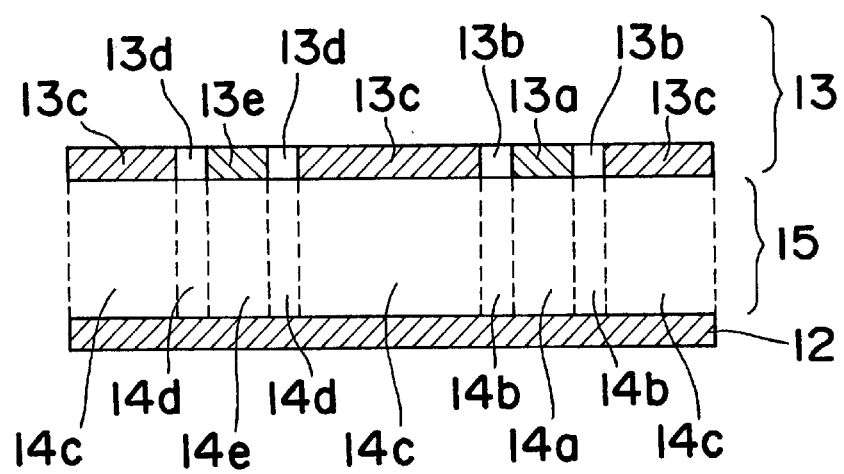

FIG. 2B shows the liquid crystal element 11 in a section in radial direction. A region 14 between the electrodes 13 and the common electrode 12 is filled with liquid crystal 15. By applying voltages to the electrodes 13 and the common electrode 12, the liquid crystal for the areas 14a to 14j is excited.

As shown in FIGS. 2A and 2B, the liquid crystal element 11 provided for tilt correction in two directions is controlled by two sets of correction means. A set of correction means for radial tilt correction comprises the first phase shifter 3, the first inverting element 7 and the first potential divider 9, while another set of correction means for tangential tilt correction comprises the second phase shifter 4, the second inverting element 8 and the second potential divider 10.

In operation of the liquid crystal driver explained above, the electrode 13c is used commonly. In order to perform correction in the two directions independently of each other, the liquid crystal element 11 is driven so as to satisfy a condition of Vc=Vh, that is, $$\{V_{R+}+V_{R-}\}/2=\{V_{T+}+V_{T1}\}/2=V_C. \quad (1)$$

For example, it is assumed here that the periodic waveform generator 1 and the amplitude controller 2 generate $V_{com}=\sin(\omega t)$, wherein $\omega$ denotes angular frequency of signal and t denotes time. Then, the output $V_{R+}$ of the first phase shifter 3, $V_{R-}$ of the first inverting element 7, $V_{T+}$ of the second phase shifter 4, $V_{R-}$ of the second inverting element 8 are represented in Eq. (2).

$$V_{R+}=-V_{R-}=\sin((\omega t+\theta+\alpha), \quad (2)$$

and $$V_{T+}=-V_{T-}=\sin(\omega t+\theta+\beta),$$

wherein $\theta=90°$ or $-90°$, $-90°\leq\alpha\leq90°$, and $90°\leq\beta\leq90°$ Thus, $\theta$ is a fixed value at 90° or −90°, and $\alpha$ and $\beta$ are instructed values for the radial tilt instruction 5 and for the tangential tilt instruction 6.

The values $V_{R+}$, $V_{R-}$, $V_{T+}$ and $-V_{T-}$ given by Eq. (2) satisfy Eq. (1). Thus, $$Vc=0,$$

and $$Vh=0.$$

Then, the region 14c in the liquid crystal element 11 is driven with a voltage of $$Vc-V_{com}=-\sin(\omega t), \quad (3)$$

so that it is driven at an effective voltage irrespective of $\alpha$ and $\beta$. Therefore, the effective voltage at the region 14c is constant when the radial tilt instruction 5 and the tangential tilt instruction 6 are given independently of each other.

Figure 3A:
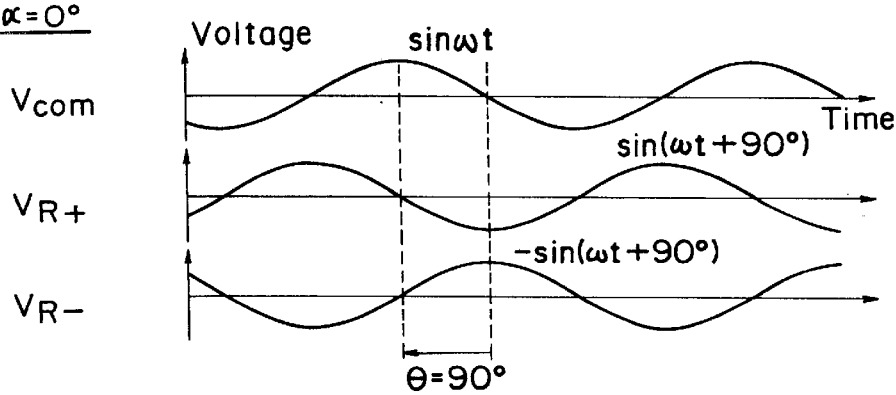
FIGS. 3A, 3B and 3C are waveform diagrams of $V_{com}$, $V_{R+}$ and $V_{R-}$ when driven with sine wave.
Figure 3B:
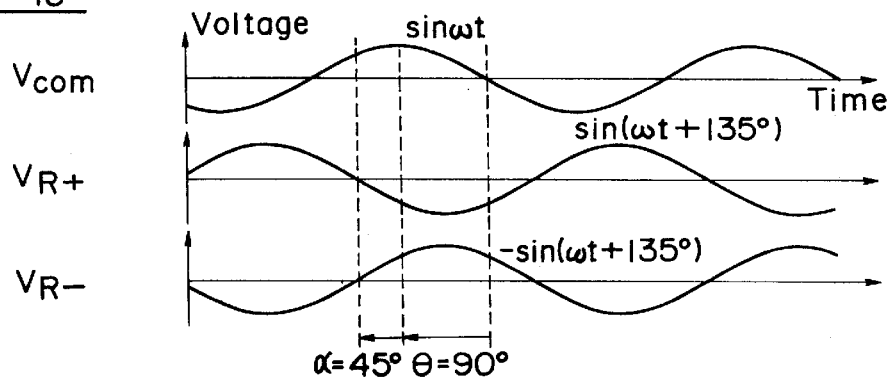
Figure 3C:
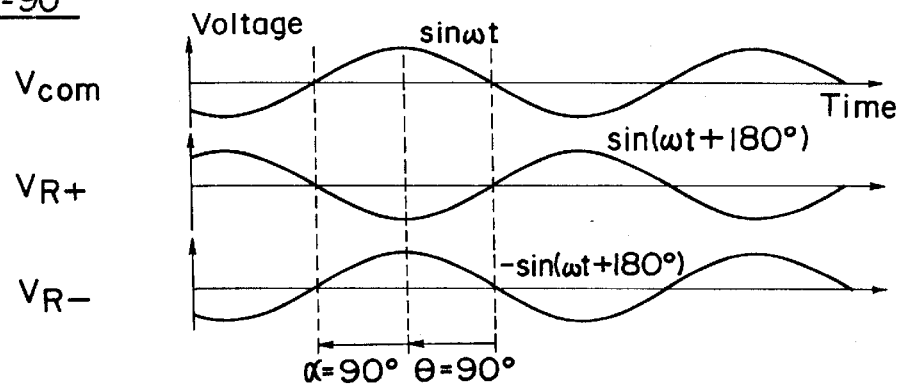

Next, tilt correction in radial direction is explained with reference FIGS. 3 to 7. FIG. 3 shows signal waveforms of $V_{com}$, $V_{R+}$ and $V_{R-}$ when driven with a sine wave. In FIG. 3, $V_{R+}$ is a waveform wherein phase is shifted relative to $V_{com}$ by the instructed value a around the center position of $\theta=90°$. FIG. 3A shows waveforms for $\theta=90°$ and $\alpha=0°$, FIG. 3B shows waveforms for $\theta=90°$ and $\alpha=45°$, and FIG. 3C shows waveforms for $\theta=90°$ and $\alpha=90°$.

If $VR_1=VR_2=6R$, then the outputs of the first potential divider 9 is given by Eq. (4)

$$Va=(10/16)*V_{R+}+(6/16)*V_{R-}=(4/16)*\sin(\omega t+\theta+\alpha),$$

$$Vb=(9/16)*V_{R+}+(7/16)*V_{R-}=(2/16)*\sin(\omega t+\theta+\alpha),$$

$$Vc=(8/16)*V_{R+}+(8/16)*V_{R-}=0, \quad (4)$$

$$Vd=(7/16)*V_{R+}+(9/16)*V_{R-}=-(2/16)*\sin(\omega t+\theta+\alpha),$$

and $$Ve=(6/16)*V_{R+}+(10/16)*V_{R-}=-(4/16)*\sin(\omega t+\theta+\alpha).$$

Figure 4A:
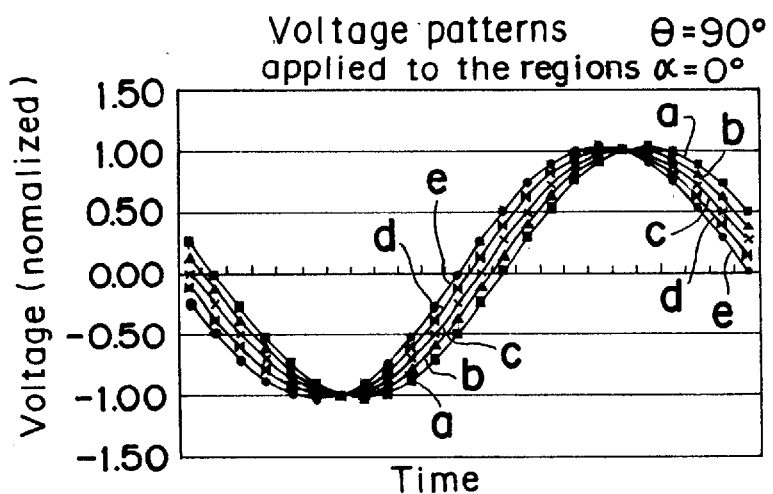
FIGS. 4A, 4B and 4C are graphs of voltage patterns applied to regions when driven with sine wave.
Figure 4B:
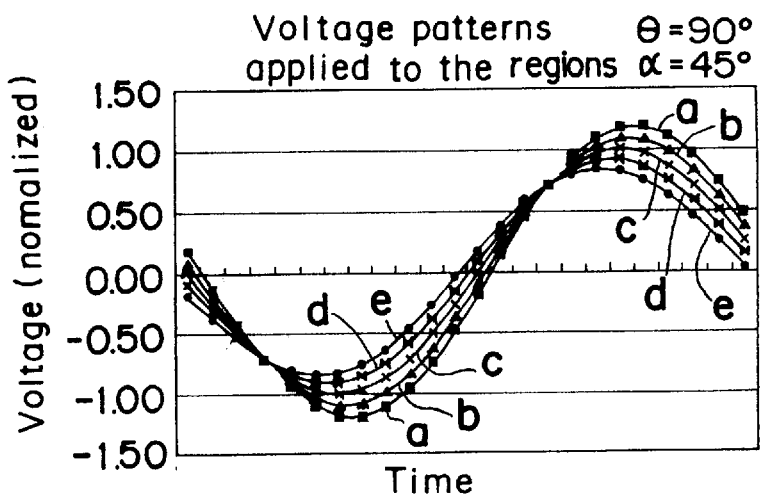
Figure 4C:
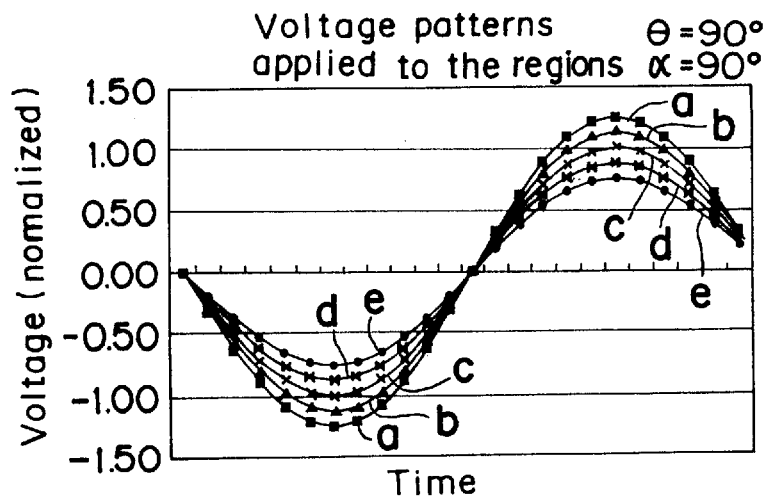

A voltage applied to the region 14a in the liquid crystal element 11 is calculated as Va applied to the electrode 13a relative to the common voltage $V_{com}$ applied to the common electrode. The voltages applied to the other areas are also calculated as voltages applied thereto relative to the common voltage $V_{com}$. FIGS. 4A to 4C show calculated voltage patterns applied to the regions 14a, 14b, 14c, 14d and 14e when driven with sine wave. In FIGS. 4A to 4C, axis of ordinate represents normalized voltage wherein wave height of $V_{com}$ is set to 1.00. FIG. 4A shows voltage patterns for $\theta=90°$ and $\alpha=0°$, FIG. 4B shows voltage patterns for $\theta=90°$ and $\alpha=45°$, and FIG. 4C shows voltage patterns for $\theta=90°$ and $\alpha=90°$.

Sine wave is applied to the regions 14a to 14e in the liquid crystal element 11, while its wave height is controlled according to the instructed value $\alpha$. In FIG. 4A, there are small differences in wave height, though slightly. In FIG. 4B, differences in wave height become larger, and in FIG. 4C, they become still larger.

Figure 5:
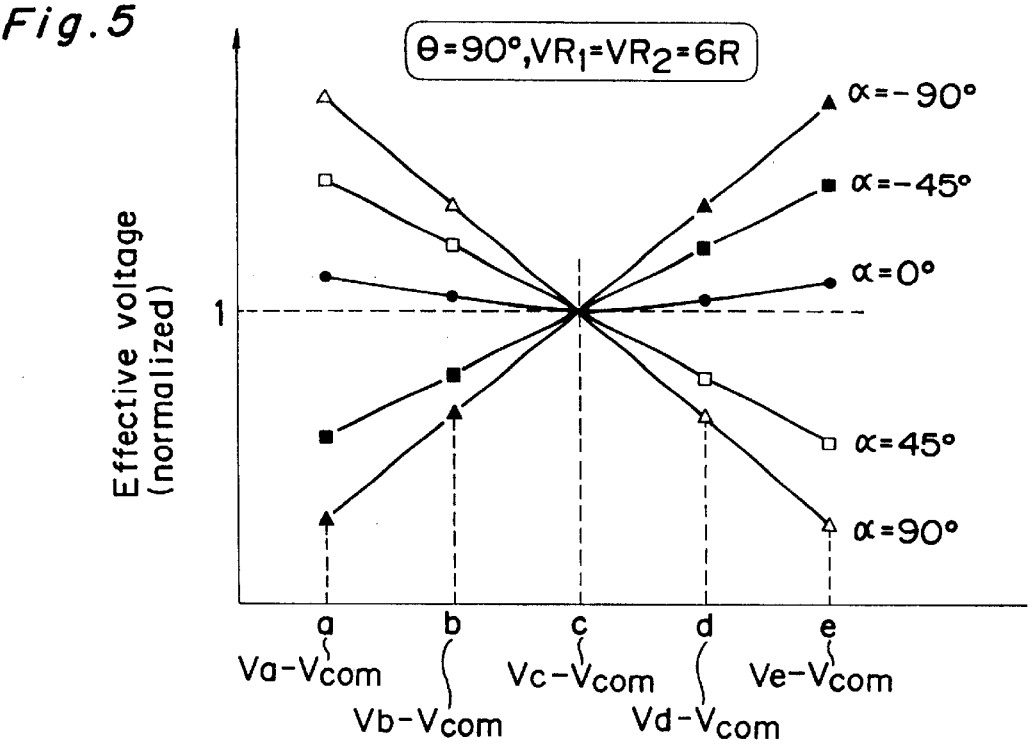
FIG. 5 is a graph of effective voltages applied to the regions when instructed value a is changed by ±90°.

The effective voltage when the voltage patterns are applied is explained with reference to FIGS. which shows effective voltages applied to the regions 14a, 14b, 14c, 14d and 14e in the liquid crystal element when the instructed value a is changed between 90° and −90°. In FIG. 5, the regions 14a to 14e are arranged in the axis of abscissa, while the axis of ordinate represents normalized effective voltage. The effective voltage applied to the region 14c is constant irrespective of the instructed value $\alpha$. The effective voltages applied to the regions 14a and 14e are changed twice compared to those applied to the regions 14b and 14d. The effective voltages applied to the regions 14a and 14b are increased or decreased with the opposite sign to those applied to the regions 14d and 14e. As will be understood from FIG. 5, the effective voltages can be increased or decreased according to the instructed value $\alpha$ like a seesaw having the center at the region 14c.

Figure 6:
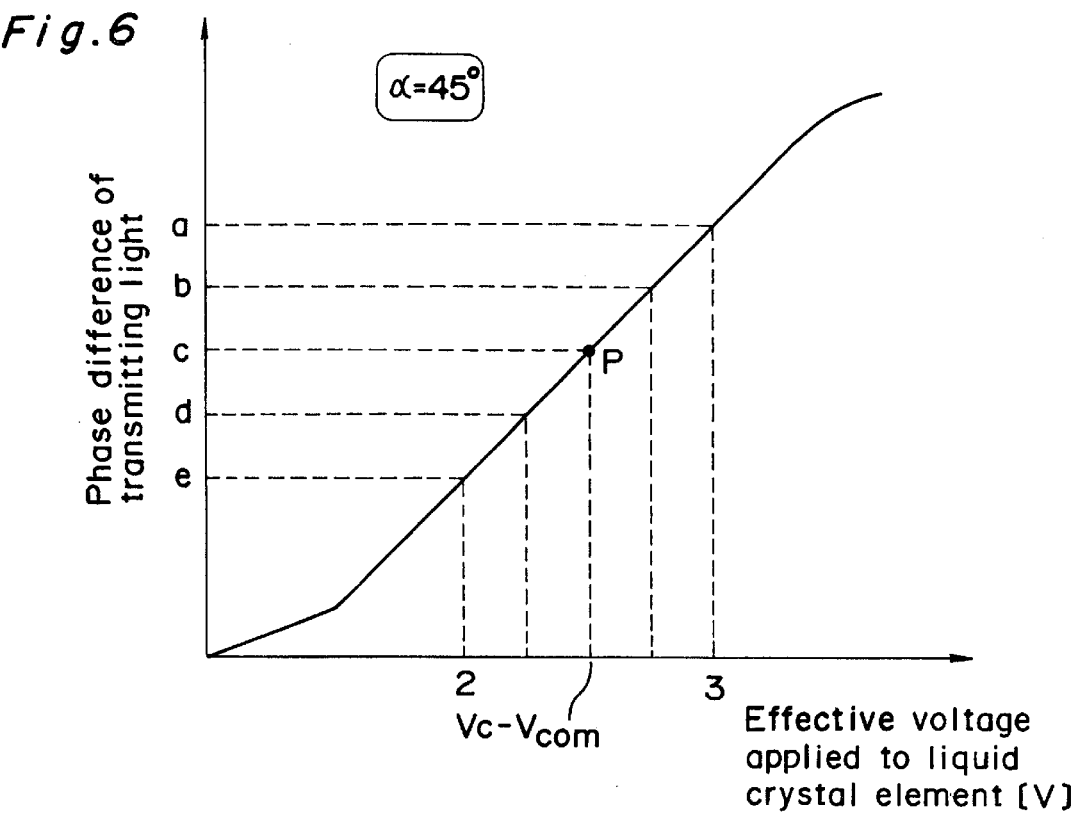
FIG. 6 is a graph of phase difference of transmitting light plotted against effective voltage applied to the liquid crystal element.

Next, in the case of α=45°, radial tilt correction is explained with reference to FIGS. 6 and 7. FIG. 6 shows a relationship between phase difference of transmitting light and the effective voltage applied to the liquid crystal element. In FIG. 6, axis of abscissa represents the effective voltage applied to the liquid crystal element, and axis of ordinate represents the phase difference of laser light transmitting the liquid crystal element. When the effective voltage is small, the liquid crystal is not excited, and the phase difference is small. As the effective voltage is increased, the phase difference tends to change linearly. As the effective voltage is increased further, the phase difference tends to increase gradually.

In the liquid crystal element having the above-mentioned characteristic, the effective voltage applied to the region 14c is set in a range where the phase difference is changed linearly, and it is used as an operation point (point P in FIG. 6). The effective voltage may be set by the amplitude controller 2.

As shown in FIG. 5, the effective voltages applied to the regions 14a to 14e at α=45° are changed linearly around the region 14c as the center. As shown in FIG. 6, the phase difference of laser light transmitting the regions is the largest in the region 14a and the smallest in the region 14e. The phase difference of the transmitting light decreases gradually from the region 14a to the region 14e.

Figure 7:
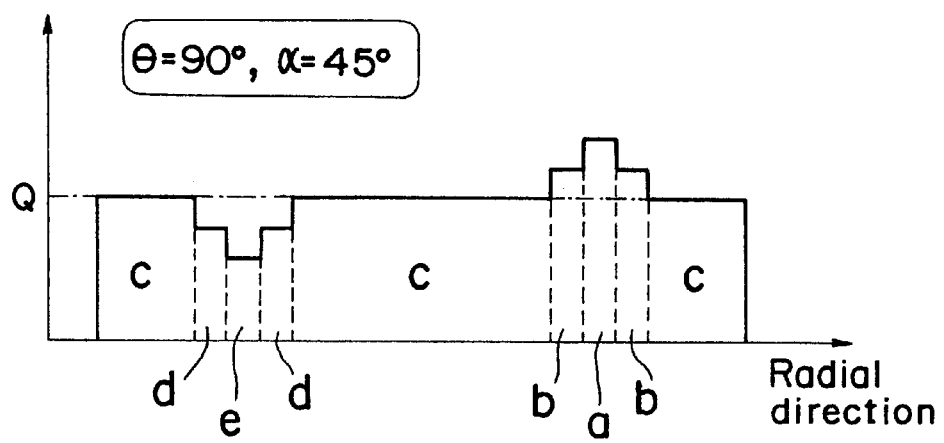
FIG. 7 is a graph of phase difference of transmitting light when θ=90° and α=45°.

FIG. 7 shows the phase difference of transmitting light in the radial direction when θ=90° and α=45°. The axis of ordinate represents the phase difference of transmitting light, and the axis of abscissa represents position in a section in radial direction in the liquid crystal element 11. When the instructed value a is changed, the unevenness is changed upward and downward around the point Q along the axis of ordinate according to the relationship shown in FIGS. 5 and 6. Thus, it is apparent that the phase difference of transmitting light in radial direction can be controlled, and radial tilt can be corrected by controlling the instructed value α. The phase difference and the signal processing are similar to prior art, and further explanation thereon is omitted here.

It is noted that the amplitude controller 2 is not necessarily needed. If the operating point P in FIG. 5 is fixed, it can be included in the periodic waveform generator 1. Further, the amplitude controller 2 may be set at an input stage of the potential divider, and it need not necessarily be arranged just after the periodic waveform generator 1.

In the above-mentioned example, the operating center of the phase shifter is set to θ=90°. However, the operation for θ=−90° is similar if the sign is reversed.

If the phase shifter using phase shift quantities fixed at ±90° is provided at the side of $V_{com}$, it can be set that θ=0°. Then, the structure of the first and second phase shifters 3, 4 can be simplified.

Further, as indicated with a dashed line in FIG. 1, an output terminal of output voltage Vc of the first potential divider 9 in correspondence to a half of the total resistance thereof is connected to another output terminal of output voltage Vh of the second potential divider 10 in correspondence to a half of the total resistance thereof In this case the condition of Vc=Vh can be realized with high precision, and voltage difference between them can be prevented from occurring when the characteristics of the potential dividers are different. Then, the electrode 13c is used commonly in the correction in radial and tangential directions, so that tilt correction can be carried out with high precision without interference between the two directions, by satisfying the condition of Vc=Vh.

Tilt correction in tangential direction is similar to tilt correction in radial direction explained above. Then explanation of tilt correction in radial direction is omitted here.

Next it is explained why the variable resistors $VR_1$ and $VR_2$ have larger resistance values than the resistance value R of the other resistors. For example, the variable resistors $VR_1$ and $VR_2$ have resistance values of 6R. The variable resistors $VR_1$ and $VR_2$ are provided not for tilt correction, but for aberration correction in radial direction of the object lens.

Figure 8:
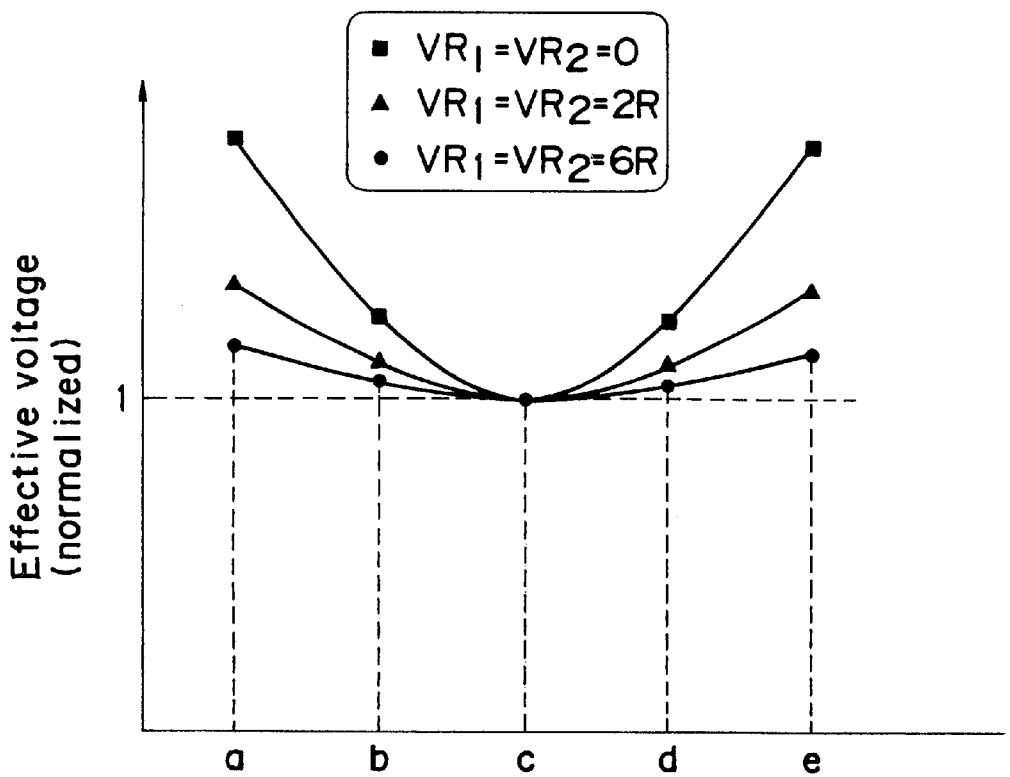
FIG. 8 is a graph of effective voltage applied to the regions in the liquid crystal element when the resistances of variable resistors are changed.

Situations where the resistance of the variable resistors is set to 0, 2R and 4R are explained below. FIG. 8 shows effective voltages applied to the regions in the liquid crystal element when the resistances $VR_1$,=$VR_2$ of the variable resistors are changed wherein $VR_1$=$VR_2$. As shown in FIG. 8, as the resistances of the variable resistors are decreased, the effective voltages applied to the regions 14a and 14e become larger as a parabola having the minimum at the region 14c. Therefore, the slope of the parabola can be changed by controlling the resistances of the resistors $VR_1$ and $VR_2$.

Figure 9:
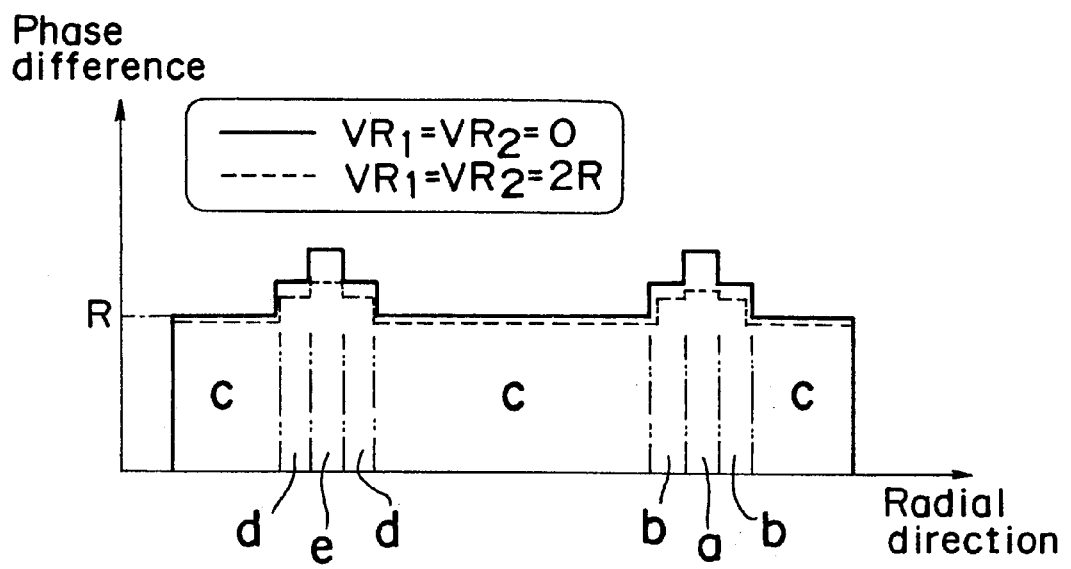
FIG. 9 is a graph of phase difference of transmitting light when the effective voltage shown in FIG. 8 is applied to the liquid crystal element.

FIG. 9 shows the phase difference of transmitting light when the effective voltages shown in FIG. 8 are applied. A solid line in FIG. 9 represents the phase difference of transmitting light in the liquid crystal when $VR_1$=$VR_2$=0, while a dashed line in FIG. 9 represents the phase difference of transmitting light in the liquid crystal when $VR_1$=$VR_2$= 2R. Thus, it is apparent that the phase difference in radial direction can be changed by controlling the resistance values of $VR_1$ and $VR_2$ where the region 14c is at the center of the phase difference change. That is, this is equivalent to correction of spherical aberration of object lens.

Usually aberration in radial direction of an object lens is very small, and it is not necessary to control the resistance values of $VR_1$ and $VR_2$. However, it is effective when a high NA (numerical aperture) lens is used for high recording density necessary for DVD (digital versatile disk or digital video disk) or for a higher recording density. If the resistance values of $VR_1$ and $VR_2$ are increased twice or more than those of the other resistors, the parabola shown in FIG. 8 becomes generally a straight line. Therefore, such resistance values are preferable. If the resistance values of $VR_1$ and $VR_2$ are six times those of the other resistors, there is practically no problem for tilt correction.

Needless to say, if it is not needed to correct aberration of object lens in radial direction, the variable resistors at two ends of the potential dividers may be resistors having fixed resistance values.

Figure 10A:
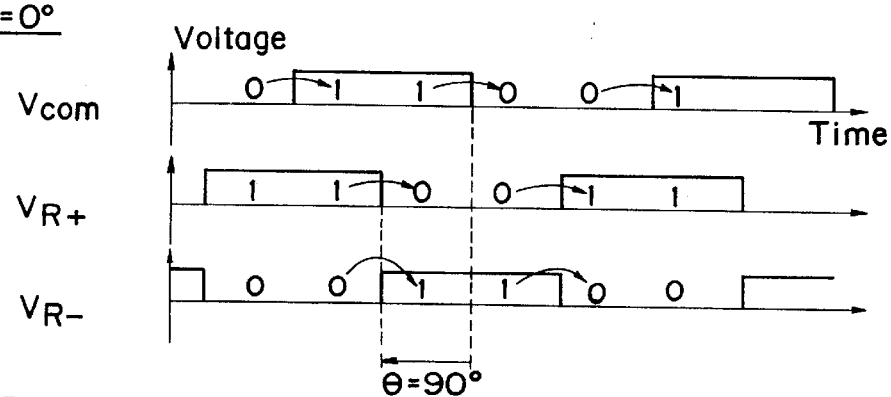
FIGS. 10A, 10B and 10C are waveform diagrams of $V_{com}$, $V_{R+}$ and $V_{R-}$ when driven with a square wave.
Figure 10B:
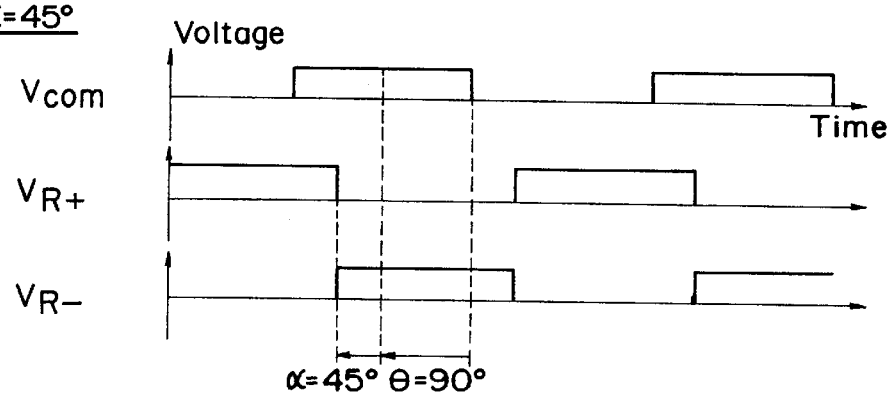
Figure 10C:
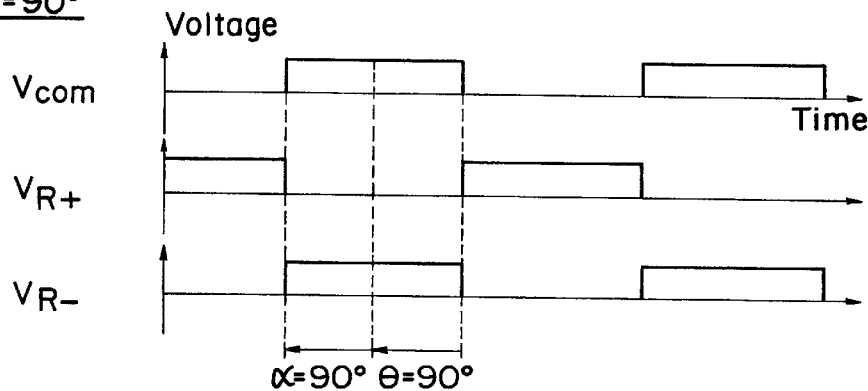

It is explained with reference to FIGS. 10 and 11 that tilt correction can also be performed by using a square wave such as a digital waveform of TTL level, though the periodic signal generator 1 generates a sign wave in the cases explained above. FIG. 10 shows signal waveforms of $V_{com}$, $V_{R+}$ and $V_{R-}$ when driven with a square wave of duty ratio of about 50%. In FIG. 10, VR+ has a waveform shifted by the instructed value α with θ=90° at the center. FIG. 10A shows a signal waveform for θ=90° and α=0°, FIG. 10B shows a signal waveform for θ=90° and α=45°, and FIG. 10C shows a signal waveform for θ=90° and α=90°.

$Vc=5/2[V]$, $V_{com}=5/2*(\text{sign}(\sin(\omega t+\theta+\alpha))+1)$, $V_{R+}=5/2*(\text{sign}(\sin(\omega t+\theta+\alpha))+1)$, (5)

and $V_R=5/2*(-\text{sign}(\sin(\omega t+\theta+\alpha))+1)$, wherein sign(x) is 1 for x>0, 0 for x=0 and −1 for x<0.

A square wave is given by Eq. (5), and FIG. 10 is similar to FIG. 4 except that the sine wave is replaced with a square wave. The output voltage of the first potential divider 9 can be calculated similarly to Eq. (4) when $VR_1=VR_2=6R$. FIG. 11 shows voltage patterns applied to the regions 14a, 14b, 14c, 14d and 14e.

Figure 11A:
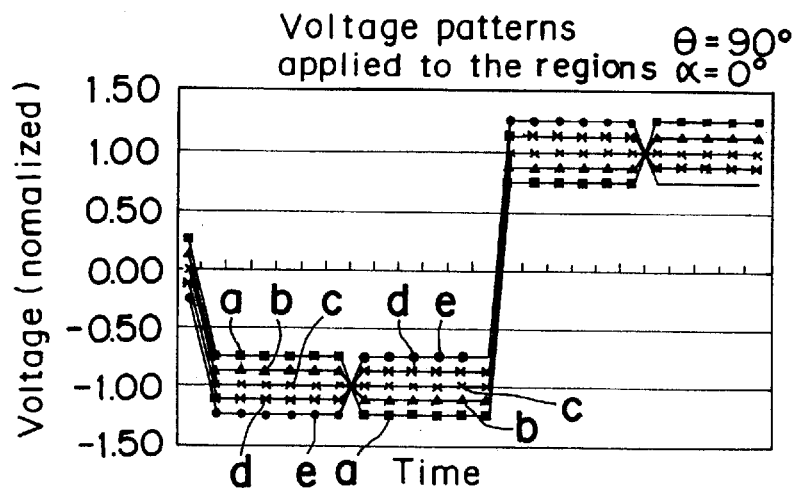
FIGS. 11A, 11B and 11C are graphs of voltage patterns applied to regions when driven with a square wave.
Figure 11B:
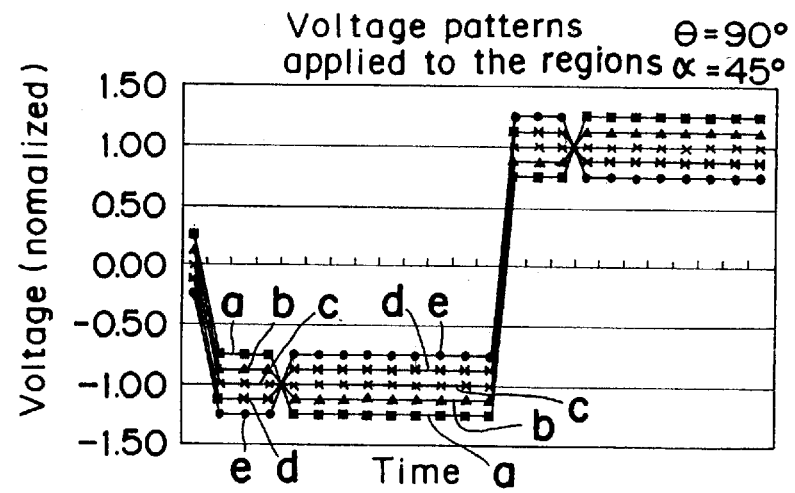
Figure 11C:
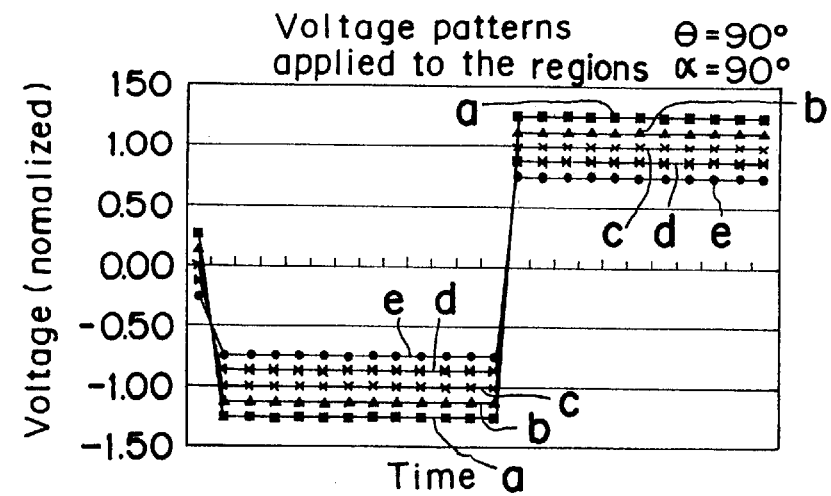

FIGS. 11A, 11B and 11C show voltage patterns applied to the regions 14a, 14b, 14c, 14d and 14e when driven with a square wave, wherein the ordinate represents normalized voltage. FIG. 11A shows the voltage pattern for $\theta=90°$ and $\alpha=0°$, FIG. 11B shows the voltage pattern for $\theta32\ 90°$ and $\alpha=45°$, and FIG. 11C shows the voltage pattern for $\theta=90°$ and $\alpha=90°$.

Square wave is applied to the regions 14a to 14e in the liquid crystal element 11, and the time of high level (high wave height) and that of low level (low wave height) are controlled according to the instructed value $\alpha$. The effective voltages of the voltage patterns shown in FIGS. 11A to 11C can be controlled similarly to FIG. 5. Operation of tilt correction for the case of square wave is similar to the case of sine wave, and the explanation thereof is omitted here.

The operation is explained above for both cases of sine wave and square wave outputted by the periodic signal generator 1. However, the waveform is not limited to the above two types, and any signal satisfying Eq. (1) may be used. When the periodic waveform generator outputs a sine wave, signals can be processed in an analog circuit by using an operational amplifier.

Further, when the periodic waveform generator outputs a square wave, a digital circuit can be used as the periodic waveform generator 1. For example, a 3-bit output port in a microprocessor or a digital signal processor is used. One bit in the output port is inverted periodically by a software timer processing to generate periodic wave. If bit inversion is performed on the other two bits at timings shifted by predetermined times from the periodic wave, it is used as phase shifters. By controlling the 3bit output port by a software program, correction in the two directions can be performed in a simple way.

The above-mentioned explanation relates to correction in the two directions. Correction in three or more directions can also be performed similarly. For correction in each direction, a phase shifter, an inverting element and a potential divider are added. When correction is performed in n directions, it is sufficient to provide an (n+1)-bit output port.

It is explained above that the spherical aberration of object lens can be corrected by controlling the variable resistors at the two ends of the first and second potential dividers 9 and 10. Next, it is explained that the spherical aberration of object lens can be corrected more precisely by a combination of the divided regions in the liquid crystal element and the potential dividers with reference to FIGS. 12A to 12C.

Figure 12A:
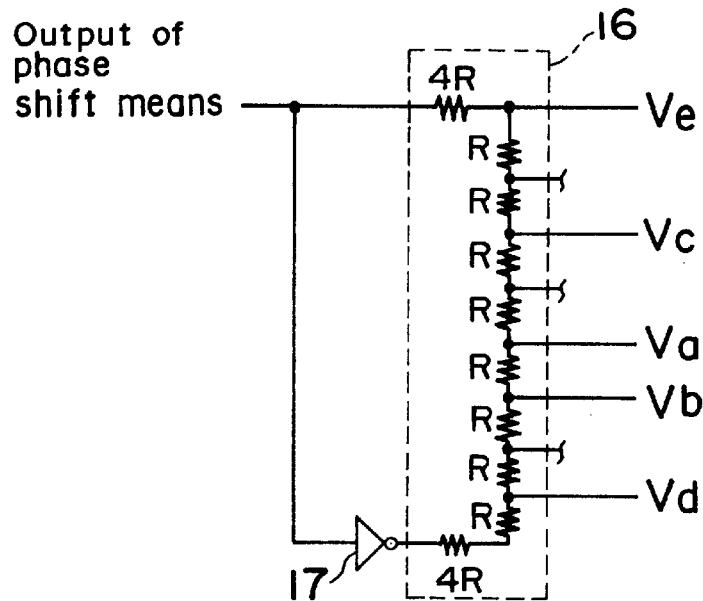
FIG. 12A is a circuit portion for correction of spherical aberration.
Figure 12B:
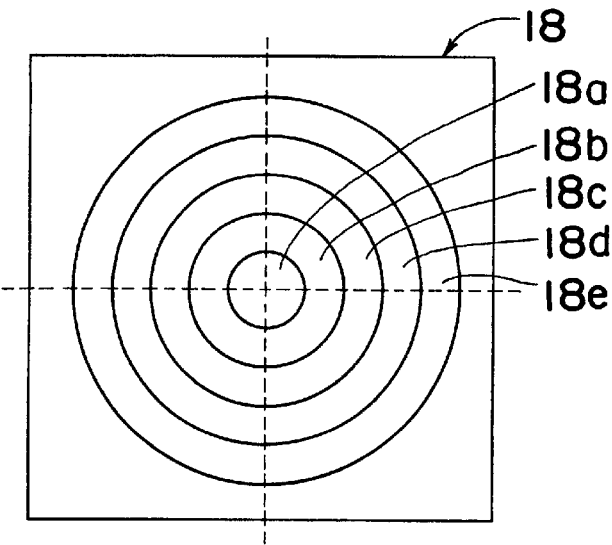
FIG. 12B is a diagram of liquid crystal element.
Figure 12C:
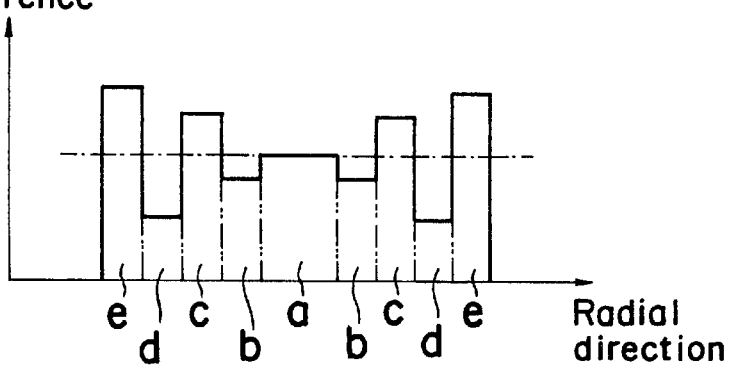
FIG. 12C is a graph of phase difference of transmitting light in radial direction.

FIG. 12A shows a structure of a potential divider 16, FIG. 12B shows division into a plurality of regions of a liquid crystal element 18, and FIG. 12C shows phase difference of transmitting light in the liquid crystal element. The potential divider 16 has eight resistors of resistance value of R connected in series and resistors of resistance value of 4R added at two sides thereof. An output of a phase shifter (not shown) is connected to an end of the potential divider 16, and the output inverted by an inverting element 17 is connected to the other end thereof. From the potential divider, an output Va is outputted at the center thereof, and outputs Vb, Vc, Vd and Ve are sent from terminals arranged alternately towards the ends of the potential divider. As shown in FIG. 12B, the liquid crystal element 18 is divided into cylindrical regions, and elements 18a, 18b, 18c, 18d and 18e are arranged successively from the center. Electrodes 18a, 18b, 18c, 18d and 18e are connected to the outputs Va, Vb, Vc, Vd and Ve. Similarly to the liquid crystal element shown in FIG. 1, the liquid crystal element 18 has a common electrode, to which an output of the potential divider is connected.

When voltages are applied to the liquid crystal element 18, the phase difference of transmitting light shown in FIG. 12C is realized, similarly to FIGS. 4 and 5. The phase difference increases from the electrode 18a to 18e towards the outer peripheral, while changing its sign alternately. Therefore, the correction of spherical aberration is performed more precisely, without using variable resistors.

It is an advantage that by using the liquid crystal element driver, a structure of a driver circuit for each direction can be simplified. Further, by using such a simple structure, tilt correction in a plurality of directions can be performed independently of each other without interference between each other.

When an output port is used for correction in two directions, only 3 bits are necessary irrespective of a number of divided areas in the liquid crystal element. Therefore, a small number of connection lines for driving the liquid crystal element is sufficient.

By controlling the variable resistors at two ends of the potential divider, tilt correction is performed while correcting spherical aberration of the object lens.

By dividing the electrodes in a liquid crystal element into cylindrical areas and by designing the connection from the potential drivers, spherical aberration can be corrected more precisely.

Figure 13:
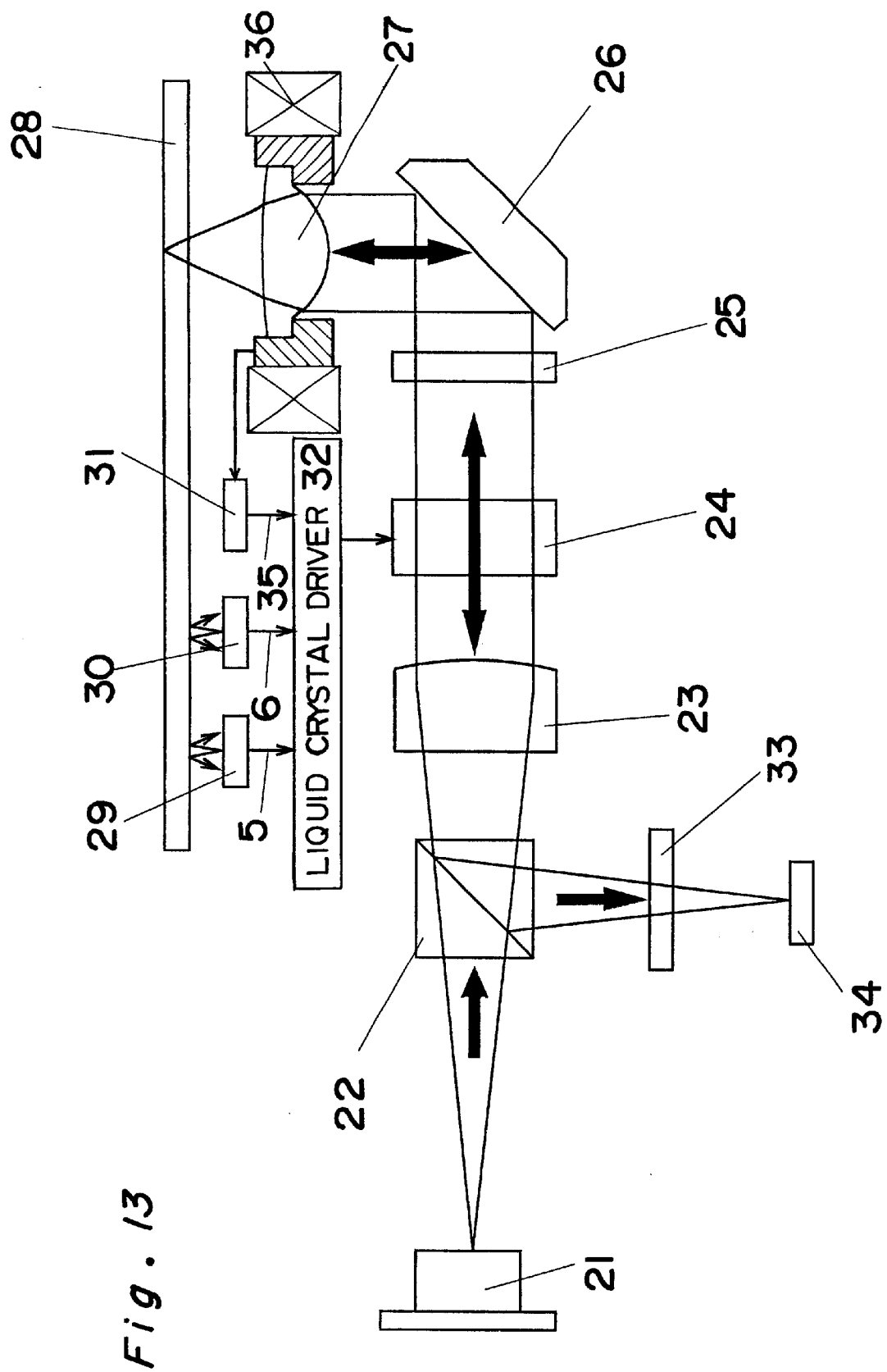
FIG. 13 is a schematic sectional view of an optical head.

FIG. 13 shows an optical head according to a second embodiment of the invention. The optical head comprises a light source 21, a polarized light beam splitter 22, a collimating lens 23, a liquid crystal element 24, a quarter wavelength plate 25, a mirror 26, an actuator 36, an object lens 27, a first tilt sensor 29, a second tilt sensor 30, a lens shift quantity detector 31, a liquid crystal driver 32, a cylindrical lens 33 and a photodetector 34. In the optical head, the liquid crystal element is mounted to a fixed component. Arrows in FIG. 13 show propagation direction of light beam. A light beam of P polarization emitted by the light source 21 transmits the polarized light beam splitter 22. It is collimated by the lens 23 and transmits the quarter wavelength plate 25, at which the light beam is changed from P polarization to circular polarization. The light beams transmitting the quarter wavelength plate 25 is reflected by the mirror 26 and condensed by the object lens 27 onto an information recording plane in an optical disk 28. The light beam reflected from the information recording plane enters again the object lens 27, is reflected by the mirror 26 and transmits the quarter wavelength plate 25, at which the light beam is changed from circular polarization to 5 polarization. The light beam transmitting the quarter wavelength plate 25 transmits the liquid crystal element24, is reflected by the polarized light beam splitter 22 and is condensed by the cylindrical lens 33 onto the photodetector 34. The photodetector 34 comprises a plurality of divided photodetection areas. It converts the incident light beam to electrical signals and generates reproduction signals and a focus control signal for astigmatic aberration technique, and a tracking control signal for phase difference technique and push-pull technique. This is a known technique and details thereof are not explained here.

Further, the first tilt sensor 29 detects tilt angle in radial direction of the optical disk, and the second tilt sensor 30 detects tilt angle in tangential direction thereof. The lens shift quantity detector 31 detects lens shift quantity of the object lens in radial direction. Radial tilt instruction 5 is outputted by the first tilt sensor 29, tangential tilt instruction 6 is outputted by the second tilt sensor 30, and lens shift instruction 35 is outputted by the lens shift quantity detector 31 to the liquid crystal driver 32. The operation thereof will be explained later.

Figure 14:
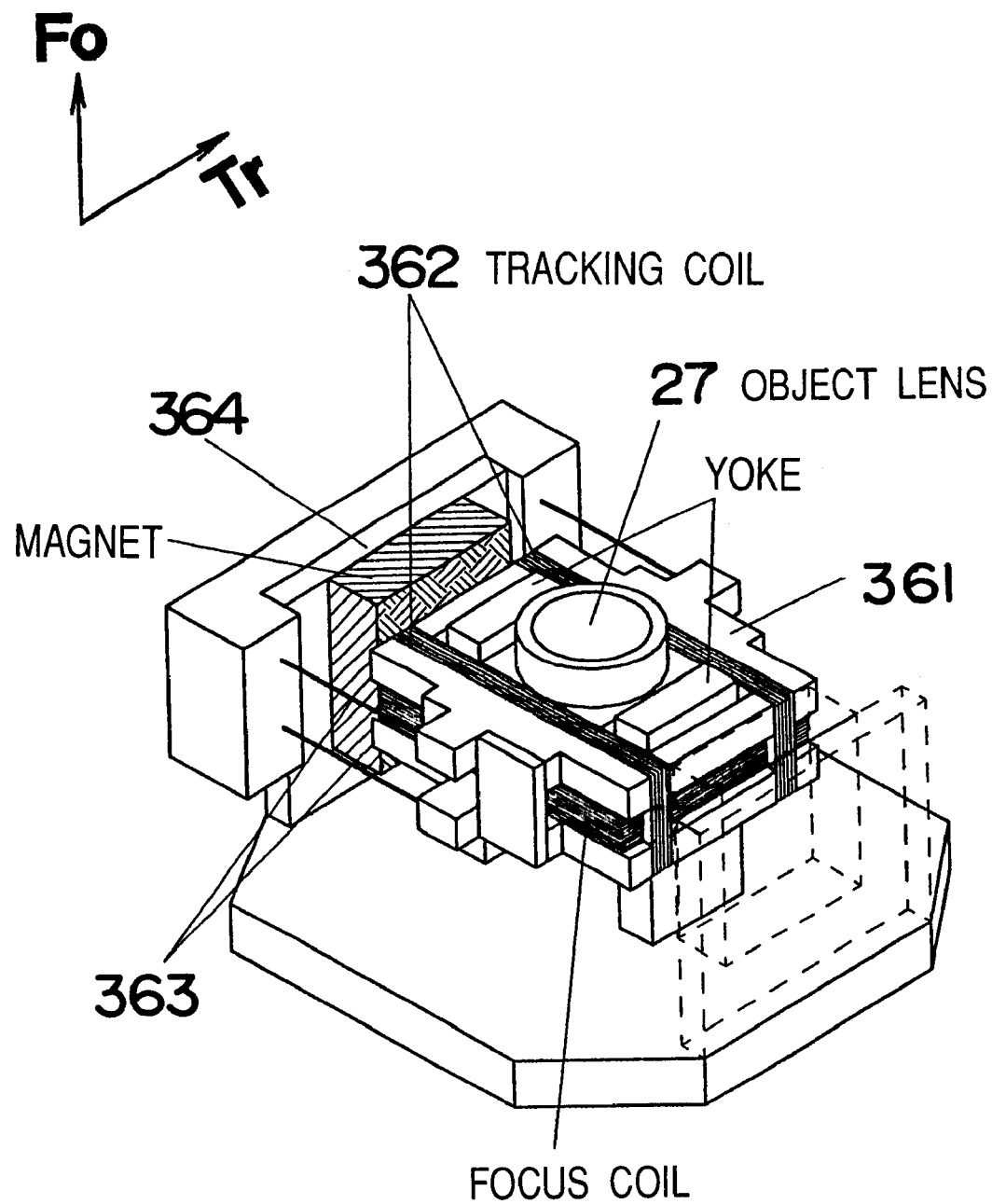
FIG. 14 is a perspective view of an actuator.

FIG. 14 shows a structure of the actuator 36, wherein Fo denotes focusing direction and Tr denotes 5 tracking direction. The object lens 27 is held by a lens holder 361 made of resin. A tracking coil 362 is wound on the lens holder 361 around the tracking direction Tr. A lens shift quantity (moving distance) of the object lens can be calculated by a driving current for the tracking coil 362. The lens holder 361 is mounted via wires 363 to a back yoke 364.

Figure 15A:
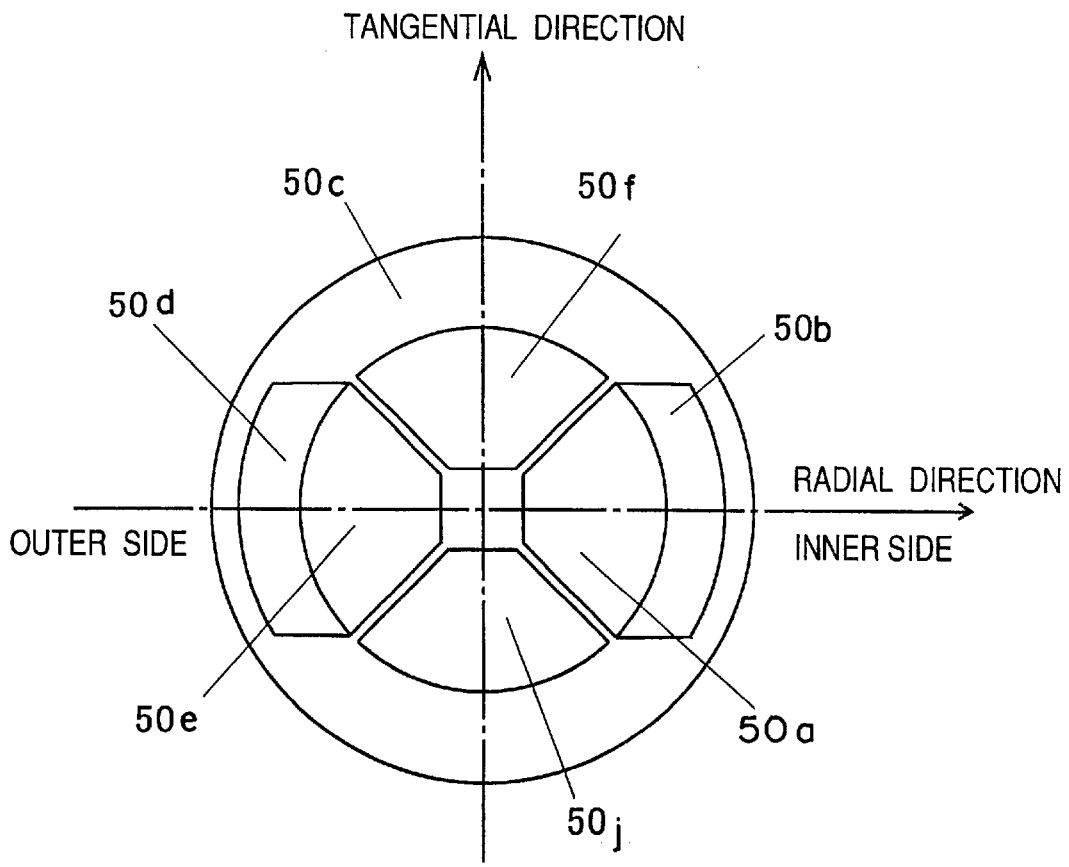
FIGS. 15A and 15B are a plan view and a sectional view of a liquid crystal element used in a liquid crystal driver.
Figure 15B:
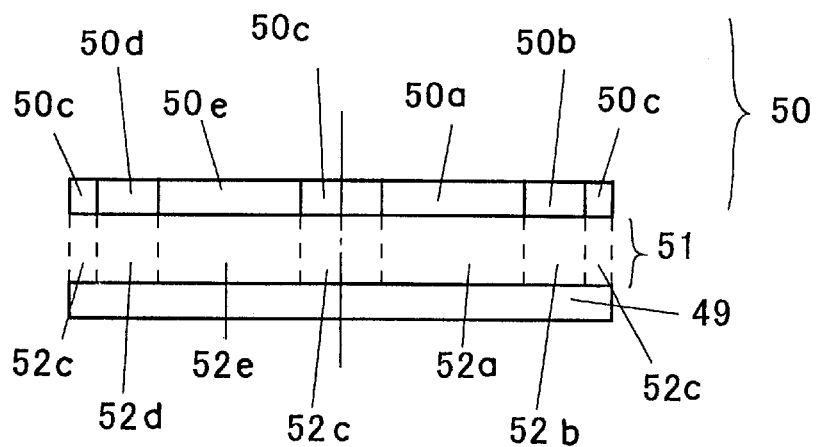

FIGS. 15A and 15B show a structure of the liquid crystal element 24 driven by the liquid crystal driver 32. FIG. 15A is a plan view of the liquid crystal element 24 in a plane wherein it is divided into a plurality of regions. The horizontal direction in FIG. 15A corresponds to radial direction of an optical disk 28, and the right direction is a direction towards the internal circumference of the optical disk. The up side in FIG. 15A corresponds to tangential direction in correspondence to the direction of tangent lines of tracks in the optical disk. As shown in FIG. 15B, a common electrode 49 is arranged opposite to the regions at the back side, while electrodes 50 comprising seven divided electrodes are arranged at the front side. The shape of the electrodes is different from that of the liquid crystal element shown in FIG. 2. A central area in the electrodes is composed of four electrodes 50a, 50e, 50f and 50j formed as generally fan-like patterns extending in the radial and tangential directions around an optical axis. These electrodes are referred to as first electrodes which correct the transmitting light beam when no lens shift of the object lens occurs relative to the optical axis. The electrodes 50a and 50e are used for radial tilt correction, while the electrodes 50f and 50j are used for tangential tilt correction. The shapes of the central four electrodes 50a, 50e, 50f and 50j are determined according to phase patterns when tilt occurs. Further, an electrode 50b is formed outside the electrode 50a, and another electrode 50d is formed outside the electrode 50e. The electrode 50b is a second electrode formed at the outside of the first electrodes in one direction along which the object lens is shifted relative to the optical axis, while the electrode 50d is a third electrode formed at the outside of the first electrodes in the other direction along which the object lens is shifted relative to the optical axis. The two central electrodes 50a and 50e in the radial direction have an outer peripheral of generally arc, and the electrodes 50b and 50d extend as elongated regions arranged outside of the two central electrodes 50a and 50e. The electrodes 50b and 50d have shapes of strip having curved lines as arcs having the center at the optical axis when lens shift of the object lens does not occur. Alternatively, the electrodes 50b and 50d have shapes of strip having curved lines as arcs having the center shifted by a predetermined distance (for example 100 $\mu$m) from the optical axis when lens shift of the object lens does not occur. An electrode 50c is used commonly for radial and tangential tilt corrections.

FIG. 15B shows a section in radial direction of the liquid crystal element 24. Liquid crystal 51 is filled between the electrodes 50 of a plurality of areas and the common electrode 49, and liquid crystals for the electrodes 52a to 52j are excited by applying voltages between the electrodes 50 and the common electrode 49.

Figure 16:
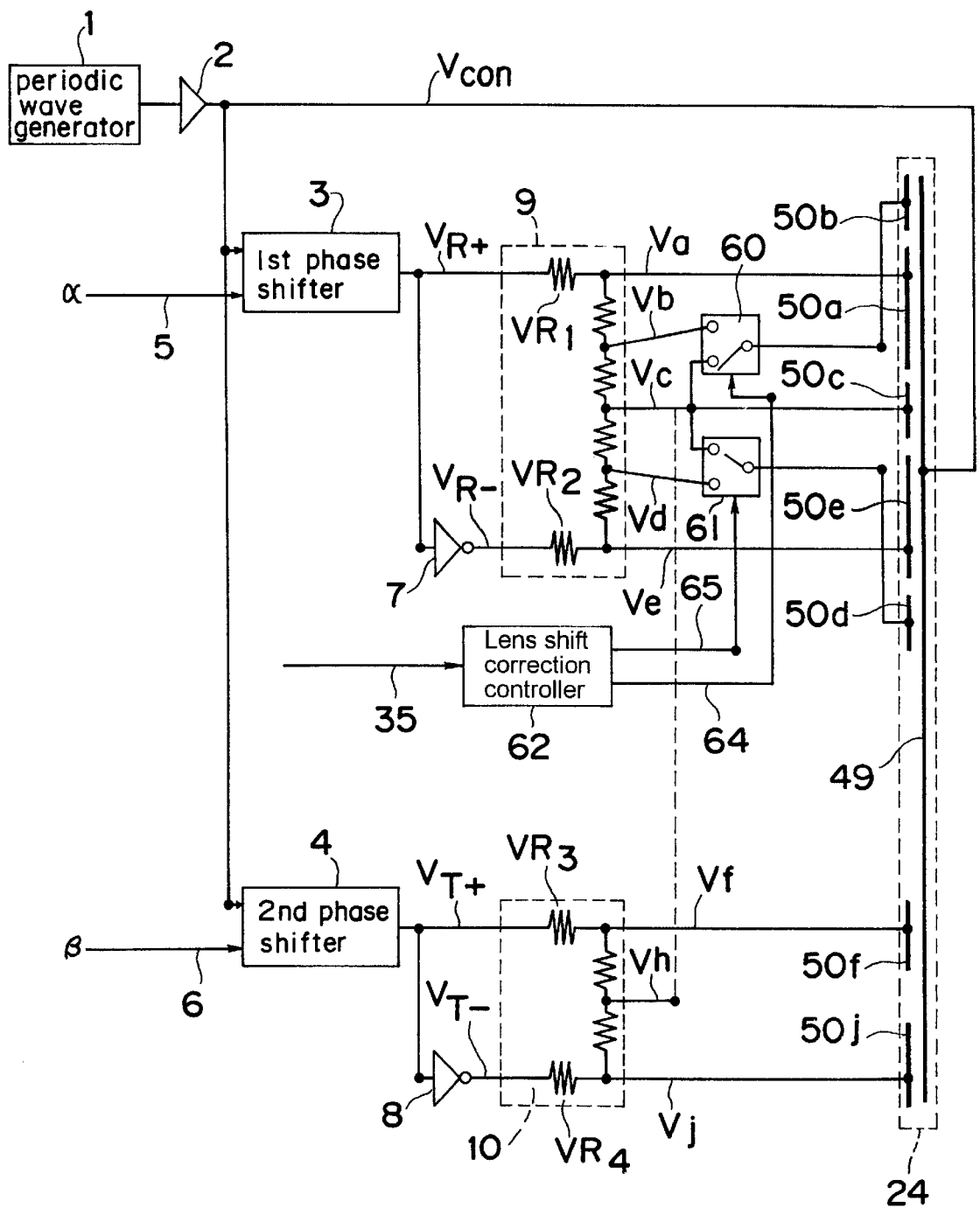
FIG. 16 is a circuit diagram on an electrical circuit of the liquid crystal driver.

Next, a structure of the liquid crystal driver 32 is explained. FIG. 16 is a block diagram of an electrical circuit of the liquid crystal driver, wherein components represented with reference numerals 1 to 10 designate like or corresponding components shown in FIGS. 1 to 10, and explanation thereon is omitted here. As shown in FIG. 15, the liquid crystal element 24 has electrodes 50 divided into a plurality of areas. An output $V_{com}$ of the amplitude controller 2 is connected to the common electrode 49 in the liquid crystal element 24.

A lens shift correction controller 62 sends first and second change instructions 64 and 65 to first and second signal changers 60 and 61 according to lens shift instruction 35 of the lens shift quantity detector 41 (FIG. 15). The first signal changer 60 applies the output voltage Vb or Vc of the first potential divider 9 selectively to the electrode 50b in the liquid crystal element 24 according to the first change instruction 64 of the lens shift correction controller 62. In concrete, when the object lens is shifted to the direction towards the internal circumference of the optical disk more than a predetermined distance, voltage Vb is applied selectively to the electrode 50b in the liquid crystal element 24, otherwise standard voltage Vc is applied selectively. The second signal changer 61 applies the output voltage Vd or Vc of the second potential divider 10 selectively to the electrode 50d in the liquid crystal element 24 according to the second change instruction 65. In concrete, when the object lens is shifted to the outer side of the optical disk more than a predetermined distance, voltage Vd is applied selectively to theelectrode 50d in the liquid crystal element 24, otherwise standard voltage Vc is applied selectively.

Figure 17:
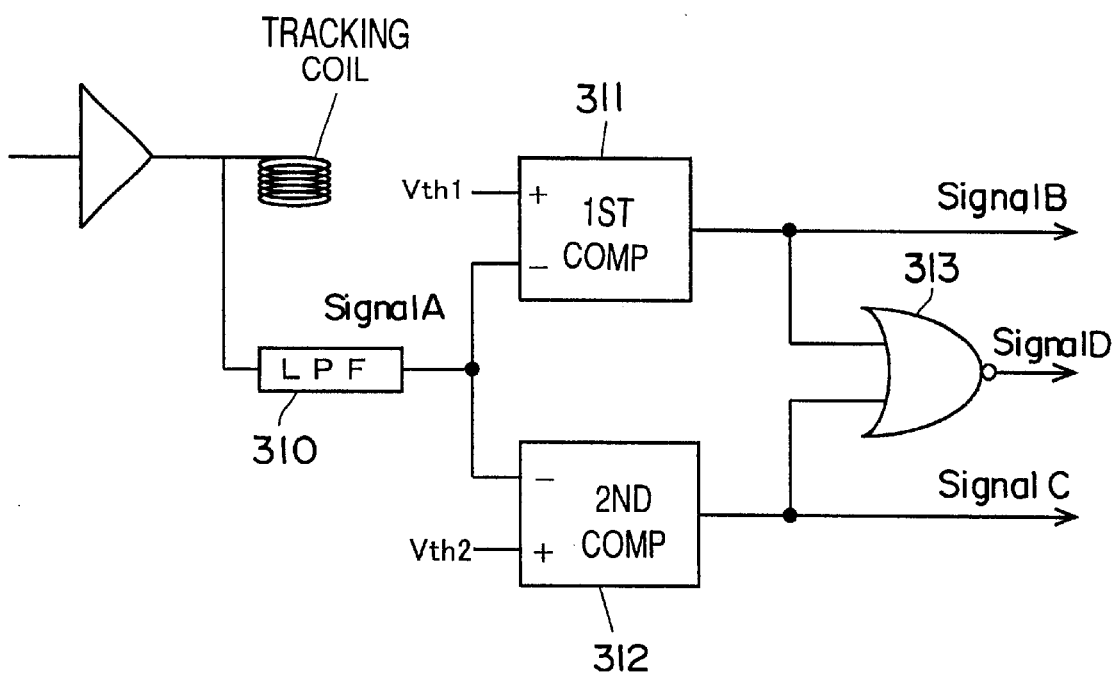
FIG. 17 is a diagram for explaining a means for detecting a lens shift quantity.
Figure 18A:
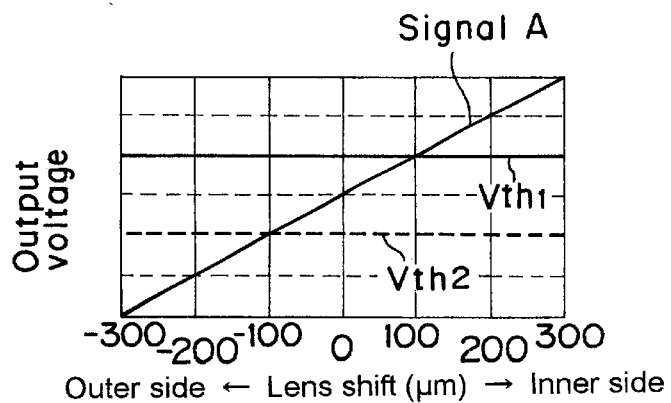
FIGS. 18A, 18B, 18C and 18D are diagrams for explaining signals in the means for detecting the lens shift quantity when an object lens is shifted.
Figure 18B:
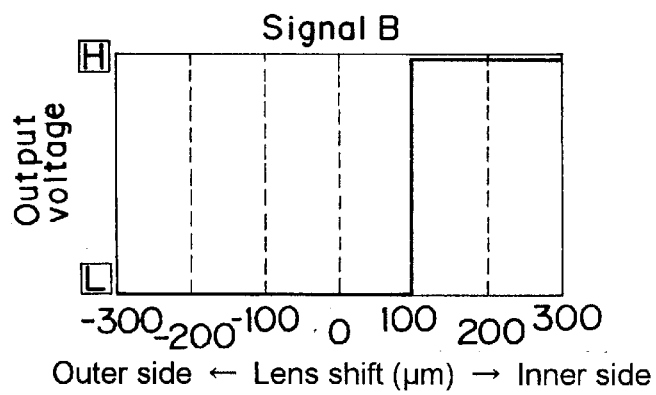
Figure 18C:
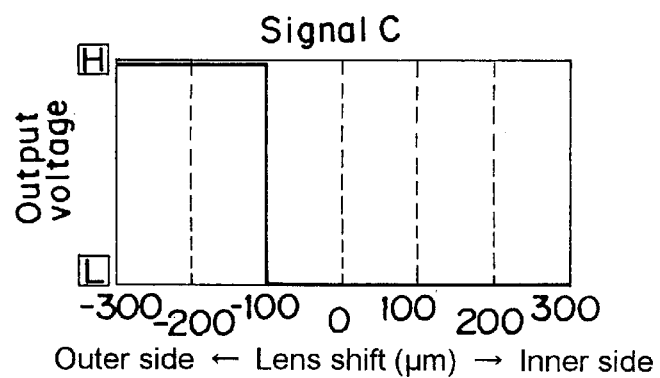
Figure 18D:
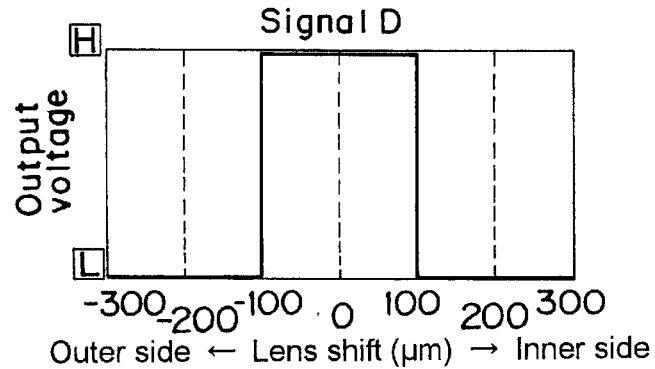

Any device may be used as the lens shift quantity detector 31 as far as lens shift quantity can be detected. For example, the lens shift quantity is detected with a reflection type photosensor arranged at a side of the object lens. In this example, as shown in FIG. 17, the lens shift quantity is detected from a driving current of the actuator in the tracking direction. FIGS. 18A to 18D show signals in the lens shift quantity detector 31 when the object lens is shifted. In FIG. 17, the driving current of the actuator in tracking direction passes a low pass filter (LPF) 310 to send signal A. As shown in FIG. 18A, the signal A is changed linearly with the shift of the object lens. The signal A is sent to first and second comparators 311 and 312. The first comparator 311 compares the input signal A with reference signal $V_{th1}$. As shown in FIG. 18B, the output signal B of the first comparator 311 becomes high level only when the object lens is shifted by 100 um or more towards the internal circumference of an optical disk. The second comparator 312 compares the input signal A with reference signal $V_{th2}$. As shown in FIG. 18C, the output signal C of the first comparator 311 becomes high level only when the object lens is shifted by 100 $\mu$m or more to the outer side. Further, signals B and C are sent to a NOR gate 313 to provide signal D shown in FIG. 18D. Signal D becomes high level only when the object lens is shifted by less than 100 $\mu$m. The signals B, C and D are used as the lens shift instruction 35.

FIG. 19 shows the phase difference of transmitting light plotted against effective voltage applied to the liquid crystal element 24, wherein the phase difference of a light beam transmitting the liquid crystal element 24 is plotted against effective voltage applied to the liquid crystal element 24. When the effective voltage is small, the liquid crystal is not excited and the phase difference is small. As the effective voltage is increased, the phase difference tends to increase linearly. As the effective voltage is increased further, increase in the phase difference tends to become small. In the liquid crystal wherein the phase difference changes as mentioned above, the effective voltage of the electrode 50c is set in a range where the phase difference changes linearly, and it is set as an operating point (point R in FIG. 19). The effective voltage is set by the amplitude controller 2.

As shown in FIG. 19, the phase difference of light beam transmitting the electrodes 50a, 50c and 50e are "a", "c" and "e", respectively. The phase difference is changed linearly with a center at the electrode 50c. The electrode 50a has the largest phase difference, while the electrode 50e has the smallest one. That is, the phase difference of transmitting light beam becomes smaller in the order of the electrodes of the liquid crystal element 24 to which output voltages Va, Vb, Vc, Vd and Ve of the first potential divider 9 are applied.

Next, tilt correction for optical disk is explained. For example, it is assumed that the optical disk 28 is inclined in the radial direction while the object lens 27 is not shifted.

Figure 20A:
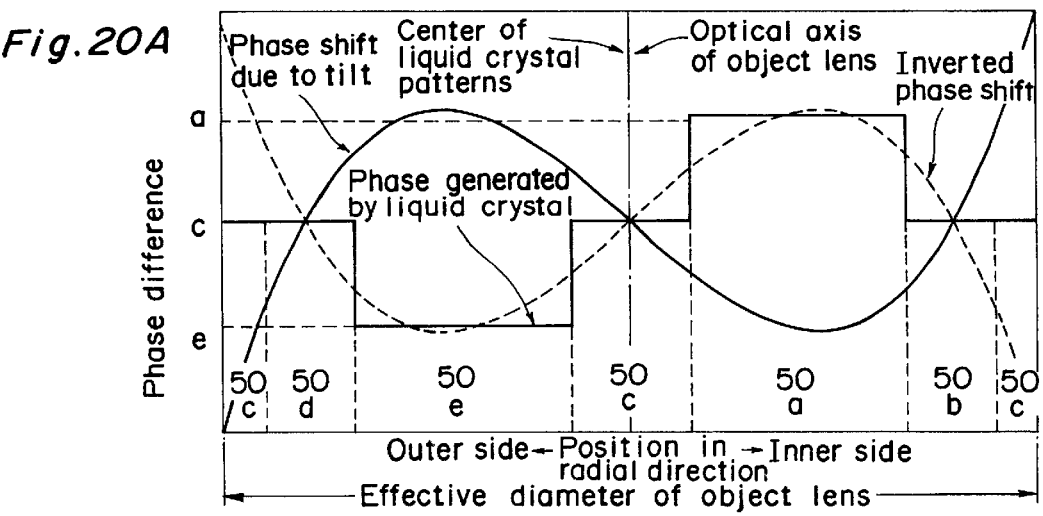
FIGS. 20A, 20B and 20C are diagrams of phase difference caused by tilt and phase difference applied to the liquid crystal element.
Figure 20B:
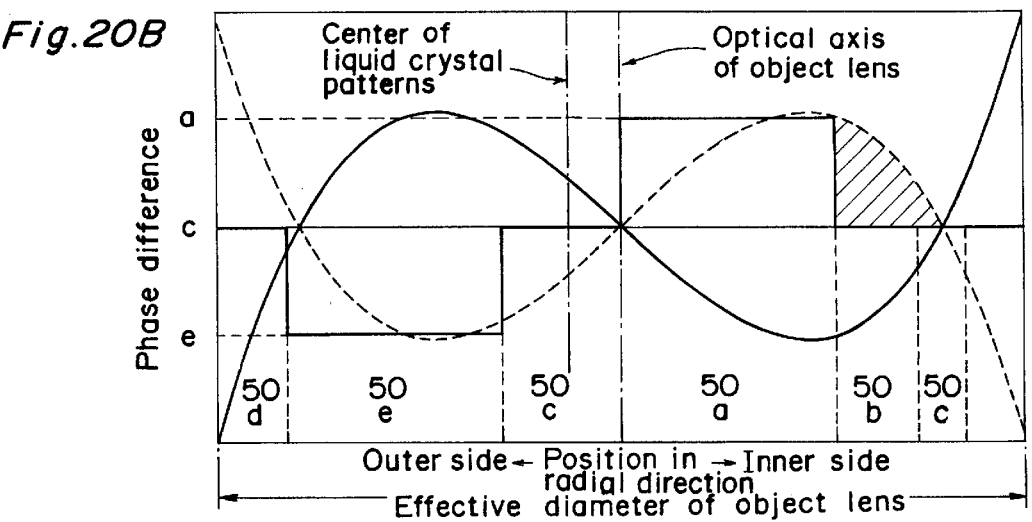
Figure 20C:
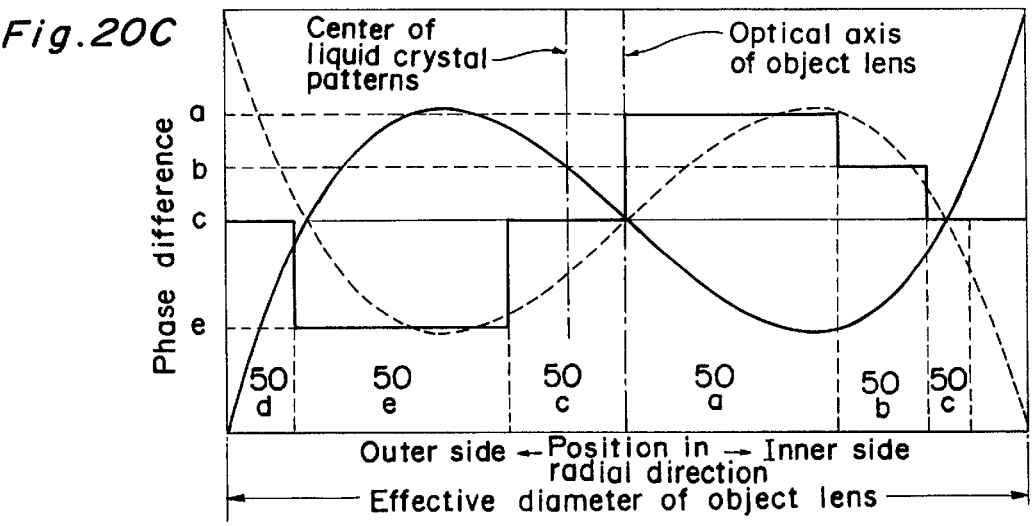

FIGS. 20A to 20C show relationships between phase difference due to radial tilt and that applied to the liquid crystal element 24, wherein axis of ordinate represents phase difference of transmitting light and axis of abscissa represents a position in a section of the object lens 27 in radial direction. The right side of the axis of abscissa corresponds to a direction towards the internal circumference of an optical disk. Similarly to the first embodiment, it is possible to control the phase difference of transmitting light in radial direction by controlling the radial tilt instructed value, but further explanation thereon is omitted here.

In FIG. 20, phase difference "a" is phase difference due to tilt generated by the liquid crystal when the object lens 27 is not shifted. A solid line of square wave represents phase difference generated by the liquid crystal. A solid line of sine-like wave represents phase difference due to tilt, and a dot line of sine-like wave is inversion thereof provided for explanation of phase difference due to tilt. In this case, positive and negative phase differences "a" and "e" are given to the electrodes 50a and 50e relative to the electrode 50c as the reference, in order to correct radial tilt. Further, the same reference voltage as the electrode 50c is applied to the electrodes 50b and 50d.

Tilt correction in tangential direction in a case where the optical disk is inclined only in tangential direction and no lens shift of the object lens 27 occurs is similar to the above-mentioned radial tilt correction in radial direction, and its explanation is omitted here.

Figure 21:
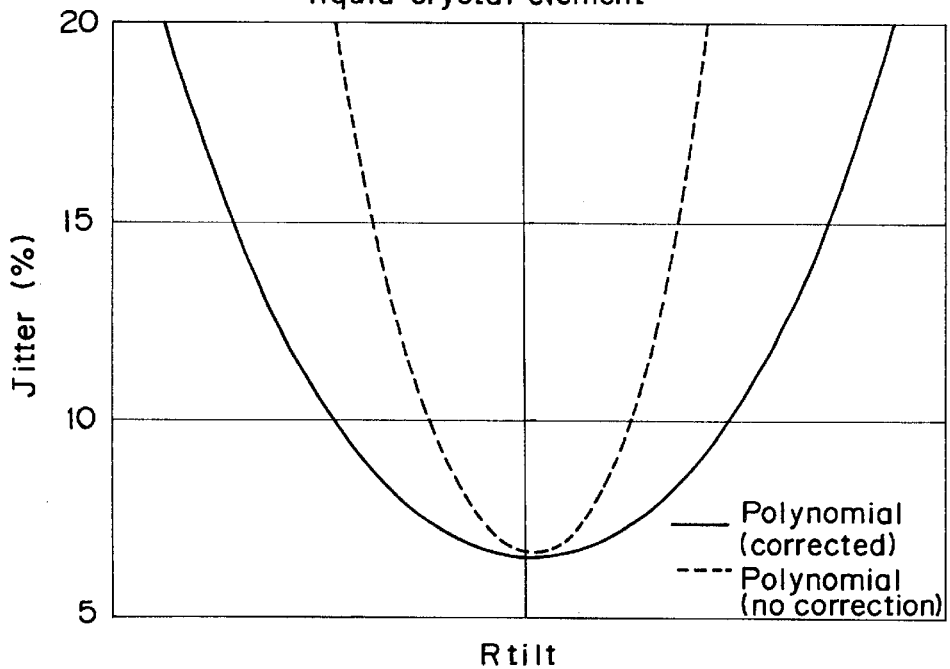
FIG. 21 is a diagram of tilt correction in radial direction.
Figure 22:
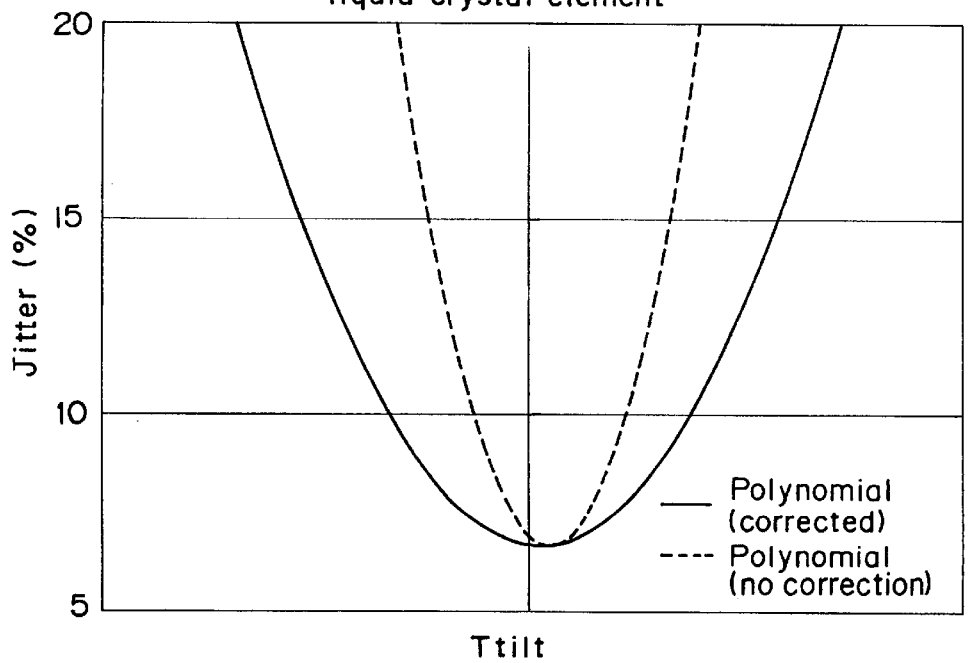
FIG. 22 is a diagram of tilt correction in tangential direction.

FIGS. 21 and 22 show characteristics when radial tilt and tangential tilt are corrected with the liquid crystal element 24 when the object lens is not shifted. A dot line represents a characteristic before tilt correction, and a solid line represents a characteristic after tilt correction. It is found that jitters are reduced largely both for radial tilt and for tangential tilt by performing tilt correction.

Next, let us assume that the optical disk is inclined only in radial direction and the object lens 27 is shifted by 200 $\mu$m towards the inner circumference. FIG. 20B shows phase difference due to tilt and phase difference generated by the liquid crystal without operating the lens shift correction function, when the object lens 27 is shifted by 200 $\mu$m towards the inner circumference. A solid line of square wave represents phase difference generated by the liquid crystal. A solid line of sine-like wave represents phase difference due to tilt, and a dot line of sine-like wave is inversion thereof provided for explanation phase difference due to tilt. In this case, because the object lens is shifted towards the inner circumference, the liquid crystal pattern is deviated from the optical axis of the object lens, so that an area represented with hatching cannot be corrected. Thus, the efficiency of tilt correction is deteriorated, and jitters increase.

Next, operation of lens shift correction is explained. FIG. 20C shows phase difference due to tilt and phase difference generated by liquid crystal under the operation of the lens shift correction function, when the object lens 27 is shifted by 200 $\mu$m towards the inner circumference. A solid line of square wave represents phase difference generated by the liquid crystal. A solid line of sine-like wave represents phase difference due to tilt, and a dot line of sine-like wave is inversion thereof provided for explanation of phase difference due to tilt. A level for operating the lens shift correction is set to, for example, 100 $\mu$m, and the lens shift quantity of the object lens 27 is set to 200 $\mu$m towards the inner circumference. In this case, the lens shift correction controller 62 outputs a first change instruction 64 according to lens shift instruction 35 of the lens shift quantity detector 31. Then, the first signal changer 60 changes the voltage applied to the electrode 50b in the liquid crystal element 24 from Vc to Vb according to the first change instruction 64, to provide phase difference "b" for tilt correction to the electrode 50b. Therefore, though lens shift of the object lens relative to the liquid crystal pattern occurs due to shift of the object lens towards the inner circumference, tilt correction performance can be improved by changing the voltage applied to the electrode 50b in the liquid crystal element 24 to Vb so as to give the phase difference "b".

Similarly, when the object lens is shifted towards the outer circumference, the lens shift correction controller 62 outputs a second change instruction 65 according to lens shift instruction 35 of the lens shift quantity detector 31. Then, the first signal changer 60 changes the voltage applied to the electrode 50d in the liquid crystal element 24 from Vc to Vd according to the second change instruction 65, to give phase difference "d" for tilt correction to the electrode 50d. Thus, deterioration due to jitters caused by lens shift is reduced.

Figure 23:
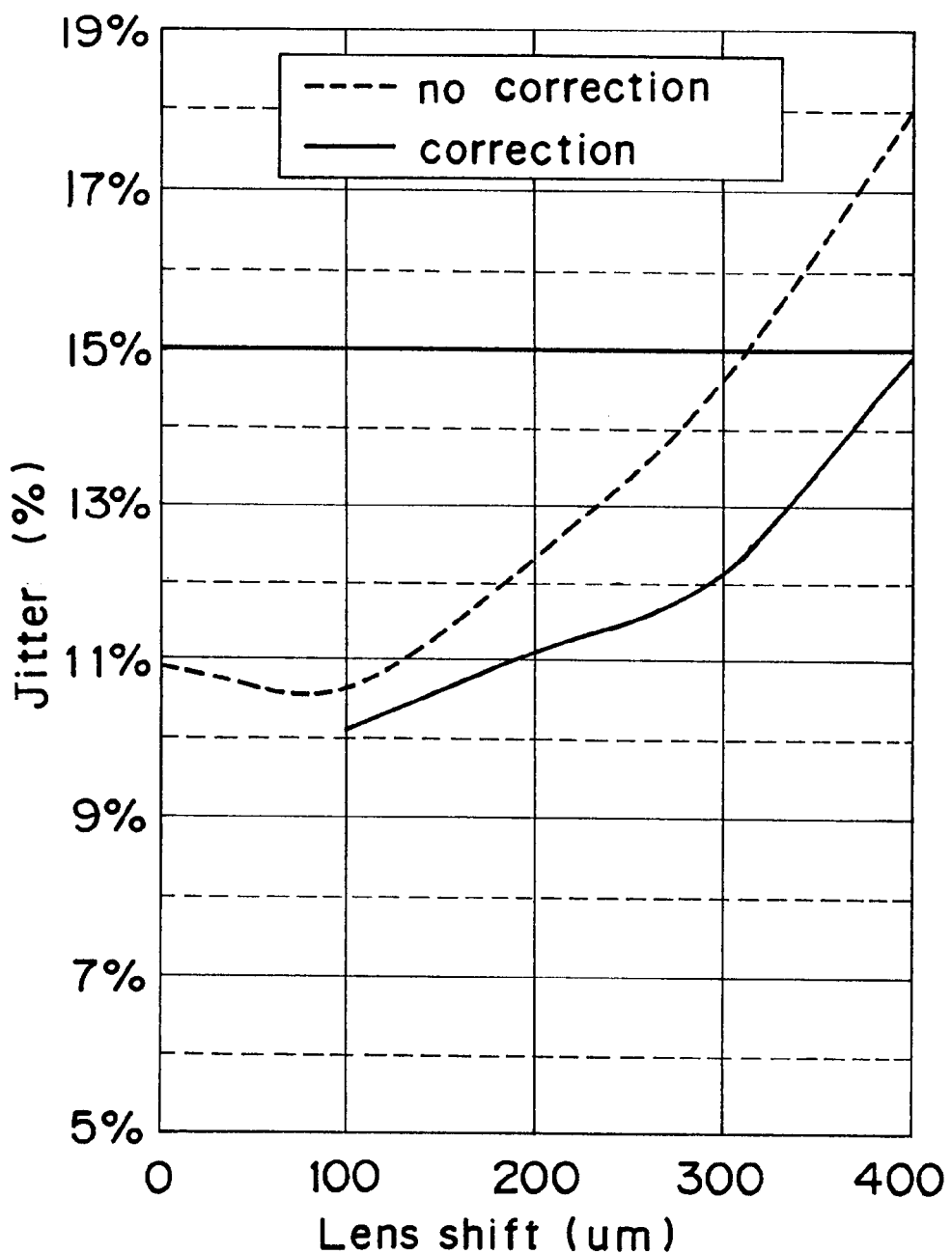
FIG. 23 is a diagram of lens shift correction.

FIG. 23 shows a characteristic when lens shift of the object lens occurs while radial tilt of 1 degree is corrected with liquid crystal element 24. A dot line represents jitters without lens shift correction, and a solid line represents jitters when lens shift correction is performed. By performing lens shift correction, the lens shift quantity at which jitters becomes 15% or less is improved from 320 $\mu$m to 400 $\mu$m or higher.

In the above-mentioned the predetermined level is set to 100 $\mu$m, but as shown in FIG. 23, it may be set between 100 and 250 $\mu$m. Alternately, it may be set to about a half of traverse shift quantity, or the like.

In this embodiment, the lens shift correction controller 62 outputs first and second change instructions according to lens shift instruction 35 of the lens shift quantity detector 31 the first signal changer 60 selectively applies voltage Vb or Vc to the electrode 50b in the liquid crystal element 24 according to the first change instruction, and the second signal changer 61 selectively applies voltage Vd or Vc to the electrode 50d in the liquid crystal element 24 according to the second change instruction. Thus, when lens shift occurs, deterioration due to jitters can be reduced.

In this embodiment, the liquid crystal pattern in the liquid crystal element 24 is divided into the shape shown in FIG. 16B. However, the liquid crystal pattern in the liquid crystal element 24 is not limited. For example, liquid crystal patterns shown in FIGS. 24 and 26 may be adopted.

Figure 24A:
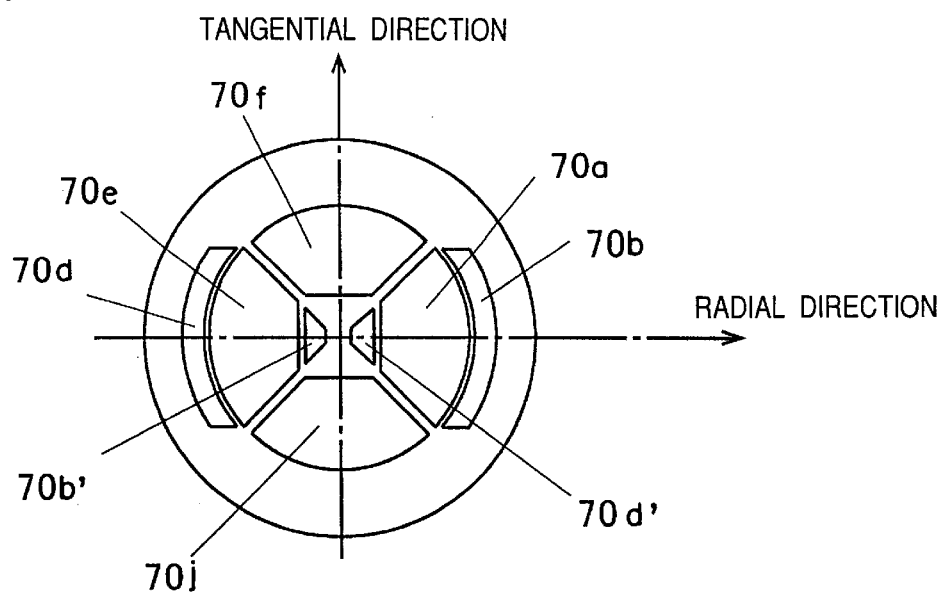
FIGS. 24A, 24B and 24C are diagrams of electrode patterns of liquid crystal elements.

For example, the liquid crystal pattern shown in FIG. 24A has first electrodes 70a, 70e, 70f and 70j, second electrodes 70b, 70b' and third electrodes 70d and 70d', and similar performance can be obtained. The electrodes 70b' and 70d' are provided around the center of liquid crystal pattern at both sides in radial direction relative to the center. The elongated electrode 70b is arranged at the outer circumference side of the electrode 70a to the right side relative to the center, while the electrode 70b' is arranged at the inner circumference side of the electrode 70e to the left side relative to the center. Similarly, the elongated electrode 70d is arranged at the outer circumference side of the electrode 70e to the left side relative to the center, while the electrode 70d' is arranged at the inner circumference side of the electrode 70a to the right side relative to the center.

Figure 25A:
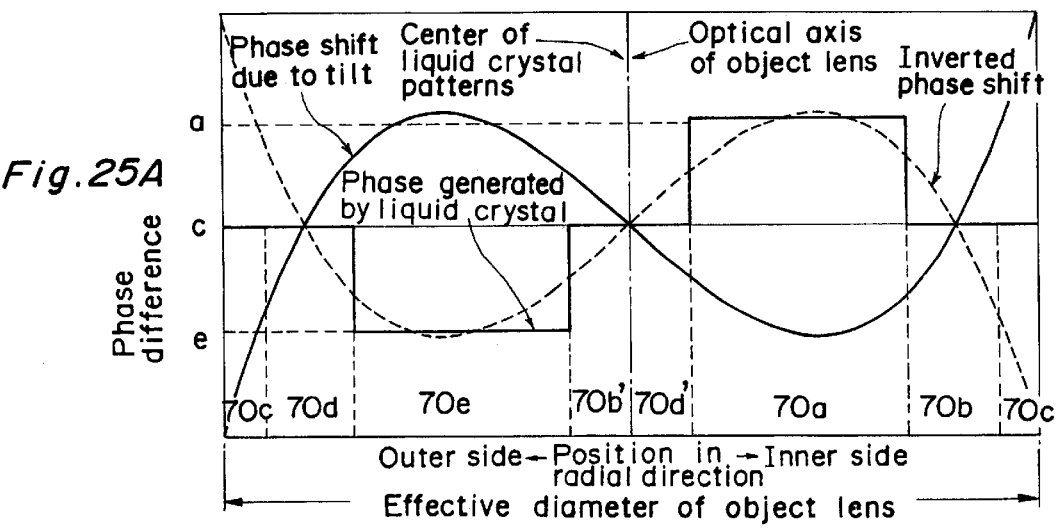
FIGS. 25A, 25B and 25C are diagrams of phase difference caused by tilt and phase difference applied to the liquid crystal element.
Figure 25B:
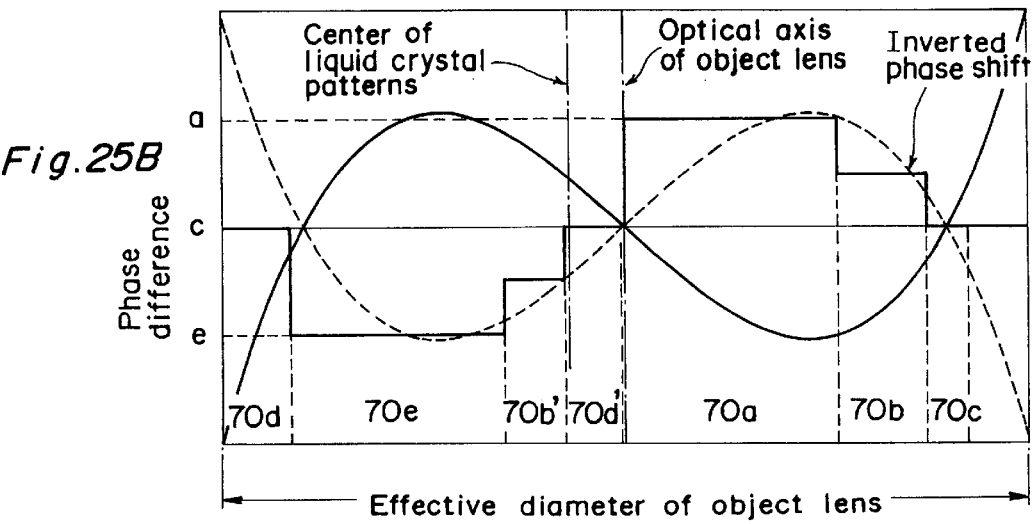
Figure 25C:
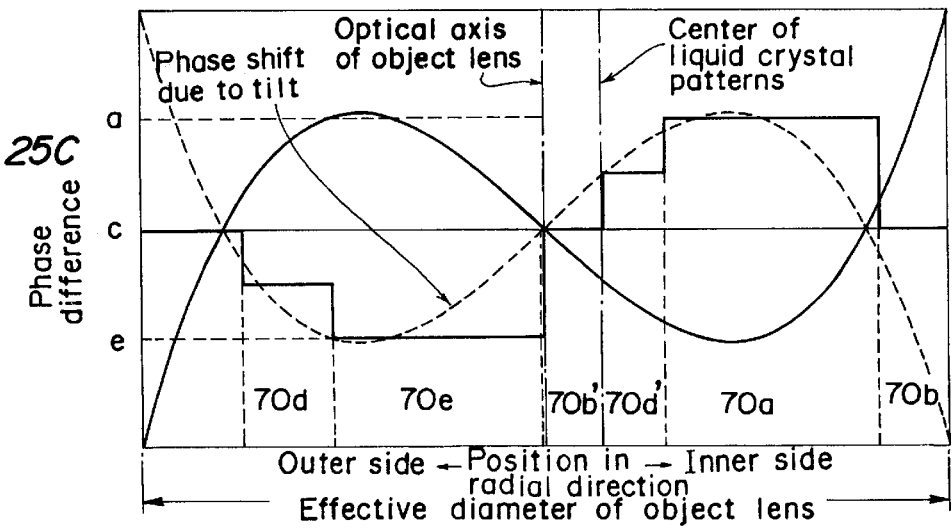

The lens shift correction function of the liquid crystal pattern is explained with reference to FIGS. 25A to 25C. Let us assume here that an optical disk is inclined only in radial direction and that the object lens 27 is shifted by 200 μm to the inner circumference. FIG. 25A shows a case when no lens shift occurs, FIG. 25B shows a case where the object lens 27 is shifted by 200 μm to the inner circumference, and FIG. 25C shows a case where the object lens 27 is shifted by 200 μm to the outer circumference. A solid line of square wave represents phase difference generated by the liquid crystal. A solid line of sine-like wave represents phase difference due to tilt, and a dot line of sine-like wave is inversion thereof provided for explanation of phase difference due to tilt. A level for operating the lens shift correction is set to, for example, 100 μm, and the lens shift quantity of the object lens 27 is set to 200 μm towards the inner circumference. When lens shift correction function is operated, besides the electrodes 70b and 10f at the outer side, electrodes 70b' and 70d' around the center are also operated. Then, signal changers are also provided for the electrodes 70b' and 70d', and they are controlled by the lens shift correction controller.

FIG. 25B shows lens shift correction function in a case where the object lens 27 is shifted by 200 μm to the inner circumference. The lens shift correction controller 62 outputs first change instruction according to the lens shift instruction of the lens shift quantity detector. According to the first change instruction, voltages applied to the electrode group of 70b, 70b' are changed, to give phase difference for tilt correction to the electrodes 70b, 70b'. The second electrodes 70b, 70b' change the phase in a direction for correcting the phase difference due to tilt in regions where the electrodes 70a and 70d cannot correct it. Therefore, though the object lens is shifted towards the inner circumference to generate lens shift between the liquid crystal pattern and the object lens, tilt correction performance can be improved by changing the voltages applied to the electrode group of 70b and 70b' to give phase difference. Thus, when lens shift occurs, deterioration due to jitters can be reduced.

FIG. 25C shows lens shift correction in a case where the object lens 27 is shifted by 200 μm to the outer circumference. Similarly, a second change instruction is outputted by the lens shift correction controller according to the lens shift instruction of the lens shift quantity detector. According to the second change instruction, voltages applied to the third electrode group of 70d, 70d' in the liquid crystal element 24 are changed to give phase difference to the electrode group of 70d, 70d' for tilt correction. Thus deterioration due to jitters is reduced when lens shift occurs.

Figure 24B:
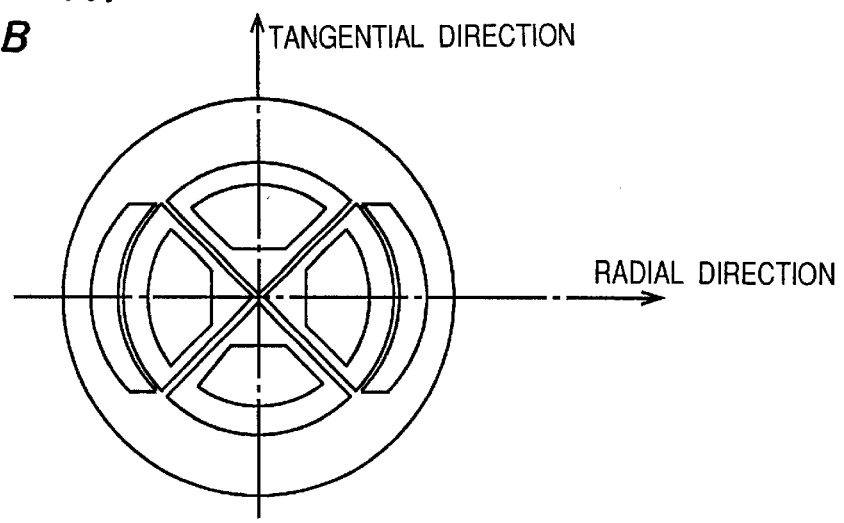
Figure 24C:
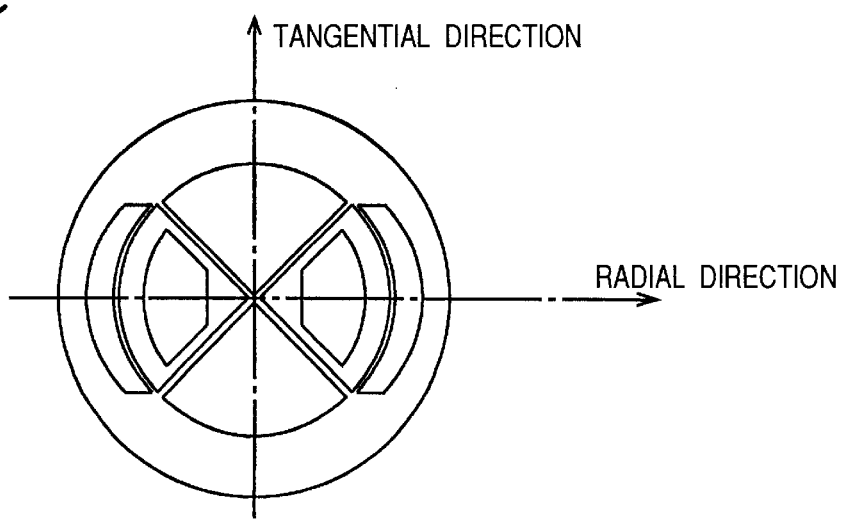

Further, in liquid crystal patterns shown in FIGS. 24B and 24C, tilt in two directions can also be corrected, and deterioration due to jitters is reduced when lens shift occurs. FIG. 24B shows a pattern similar to the electrode arrangement shown in FIG. 15A, but each of the four central electrodes are divided into outer and inner areas. FIG. 24C shows a pattern similar to the electrode arrangement shown in FIG. 15A, but each of the two central electrodes in radial direction are divided into outer and inner areas.

Figure 26A:
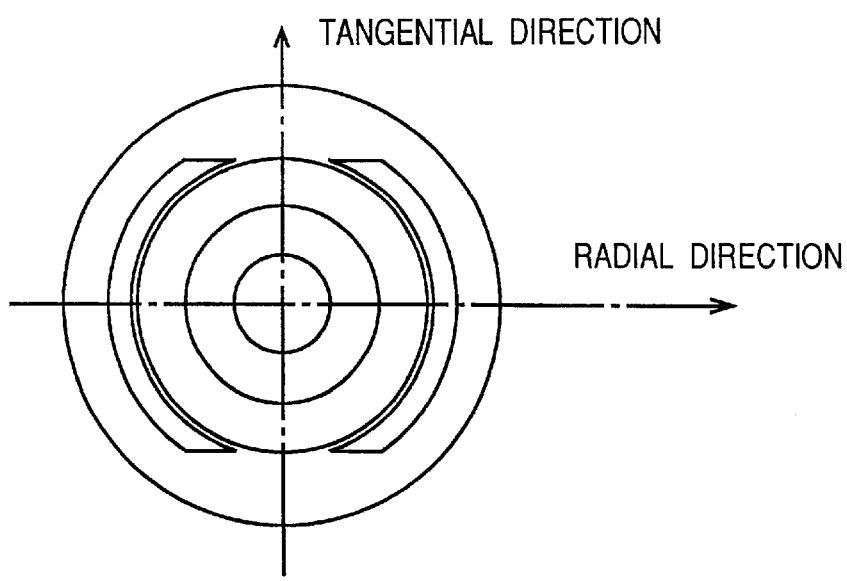
FIGS. 26A and 26B are diagrams of electrode patterns of liquid crystal elements.
Figure 26B:
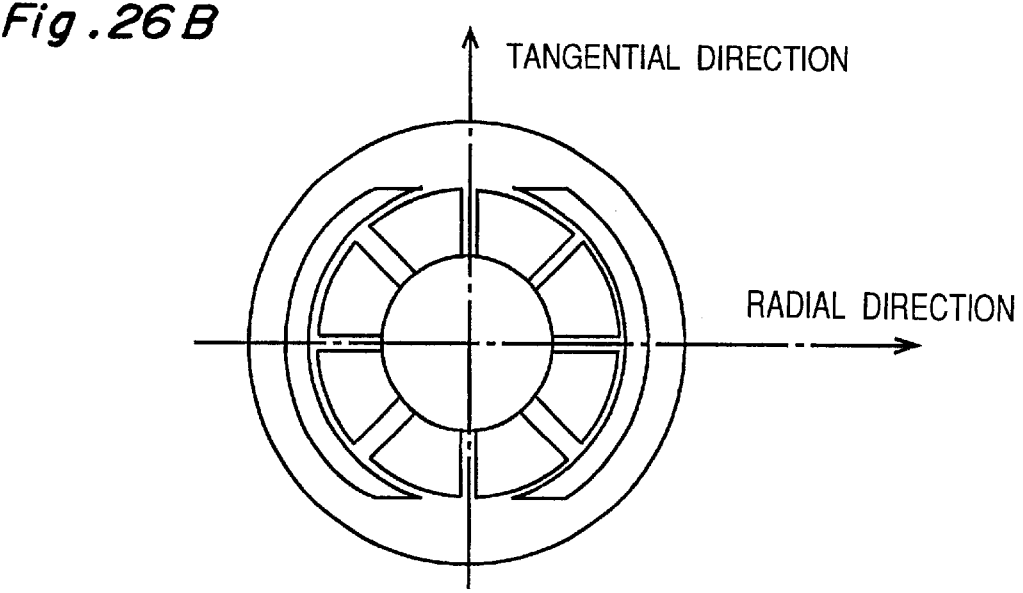

Further, in liquid crystal patterns shown in FIGS. 26A and 26B, spherical aberration and astigmatic aberration are corrected while improving deterioration due to jitters when lens shift occurs. In the pattern shown in FIG. 26A, similarly to the pattern shown in FIG. 12B, cylindrical electrodes are provided, and elongated narrow electrodes are arranged at the outer side of the cylindrical electrodes at the two side in radial direction. In the pattern shown in FIG. 26B, an outer cylindrical electrode is divided into eight areas along the circumference.

As to the signal changer 60, 61 or the like used in the above embodiments, an analog switch or the like may be used. Any device which changes the signal can be used.

The embodiments have following advantages. As mentioned above, by using the lens shift correction mechanism, deterioration due to jitters when lens shift occurs can be improved while the liquid crystal element is mounted to a fixed component.

Because the liquid crystal element is not mounted to the actuator, the actuator has a light weight. This improves the sensitivity of the actuator, improves performance on tracking and focusing control. Then, the optical head has high reliability.

Because the liquid crystal element is set on a fixed component, the optical head may have a smaller thickness. Further, the freedom of design on the electrical power supply lines to the liquid crystal element is improved.

Further, because the liquid crystal element is set on a fixed component and separated from the actuator as a heat source, a load on ambient temperature is reduced when the liquid crystal element is used, the stability of aberration correction is ensured, and the reliability of optical head is improved.

By using the above-mentioned optical head, tilt margin and lens shift margin on aberration correction are improved. Then, the precision on manufacturing and on control of the components of the optical head, and the optical head can be set up more easily. Thus, an optical head of lower cost can be fabricated. Further, it is not necessary to use a prior art tilt control mechanism for optical head in an optical disk drive. Therefore, a compact optical head of a smaller thickness can be realized.

Further, in an optical disk drive for recording and reproducing information by controlling an optical head according to control signals outputted from the optical head, reliability for recording and reproducing information is improved for an optical disk having a larger bending.

In the above-mentioned embodiments, tilt angle is detected with the tilt sensor 29 and the tilt sensor 30. However, a similar result is obtained by detecting the tilt angle by detecting and minimizing jitters, or by detecting and maximizing RF signal amplitude.

By providing the lens shift correction mechanism in an optical head, the aberration correction performance can be improved when the liquid crystal element is set on a fixed component of the optical head.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A liquid crystal driver comprising:
   a periodic waveform generator which generates a periodic waveform signal;

a phase shifter which receives the periodic waveform signal from said periodic waveform generator and shifts phase thereof according to an instructed value;

an inverting element for inverting an output signal of said phase shifter;

a potential divider comprising a plurality of resistors connected in series, being connected to the output signal of said phase shifter and to the output signal of said inverting element at two ends thereof; and a liquid crystal element comprising electrodes of a plurality of areas and a common electrode opposing the electrodes, said common electrode being connected to the periodic waveform signal outputted by said periodic wave generator, said plurality of areas being connected to output voltages of said potential divider.

2. The liquid crystal driver according to claim 1, wherein the waveform outputted by said periodic waveform generator is sine wave.

3. The liquid crystal driver according to claim 1, wherein the waveform outputted by said periodic waveform generator is a square wave having duty ratio of about 50%.

4. The liquid crystal driver according to claim 1, further comprising an amplitude controller which controls voltage amplitudes of the periodic waveform of said periodic waveform generator, the output signal of said phase shifters and the output signal of said inverting elements.

5. The liquid crystal driver according to claim 1, further comprising a further potential divider, wherein two resistors provided at two ends in each of said potential divider and said further potential divider are variable resistors.

6. The liquid crystal driver according to claim 1, further comprising a further potential divider, wherein two resistors provided at two ends in each of said potential divider and said further potential divider have resistances twice or more those of the other resistors therein.

7. The liquid crystal driver according to claim 1, wherein phase difference between the output signal of said periodic waveform generator and said phase shifter is changed around a center of +90° or −90°.

8. The liquid crystal driver according to claim 1, wherein said periodic waveform generator comprises a digital circuit which inverts bits in an output port periodically.

9. The liquid crystal driver according to claim 1, wherein said electrodes of the plurality of areas in said liquid crystal element extend as a plurality of concentric areas.

10. The liquid crystal driver according to claim 1, further comprising a further phase shifter, a further inverting element, and a further potential divider, wherein each of said inverting element and said further inverting element corresponds to one of said phase shifter and said further phase shifter, and each of said potential driver and said further potential driver corresponds to one of said phase shifter and said further phase shifter.

11. A liquid crystal driver comprising:

a periodic waveform generator which generates a periodic waveform signal;

a plurality of phase shifters provided for phase shift in a plurality of directions, each of said plurality of phase shifters receiving the periodic waveform signal from said periodic waveform generator and shifts phase thereof according to an instructed value for each direction in the plurality of directions;

a plurality of inverting elements for inverting output signals of said plurality of phase shifters;

a plurality of potential dividers each comprising a plurality of resistors connected in series, being connected to the output signal of one of said phase shifters and to the output signal of one of said plurality of inverting elements at two ends thereof; and a liquid crystal element comprising electrodes of a plurality of areas extending in the plurality of directions and a common electrode opposing the electrodes, said common electrode being connected to the periodic waveform signal outputted by said periodic wave generator, said plurality of areas being connected to output voltages of said plurality of potential dividers.

12. The liquid crystal driver according to claim 11, wherein the waveform outputted by said periodic waveform generator is sine wave.

13. The liquid crystal driver according to claim 11, wherein the waveform outputted by said periodic waveform generator is a square wave having duty ratio of about 50%.

14. The liquid crystal driver according to claim 11, further comprising an amplitude controller which controls voltage amplitudes of the periodic waveform of said periodic waveform generator, the output signal of said phase shifters and the output signal of said inverting elements.

15. The liquid crystal driver according to claim 11, wherein two resistors provided at two ends in each of said potential dividers are variable resistors.

16. The liquid crystal driver according to claim 11, wherein two resistors provided at two ends in each of said potential dividers have resistances twice or more those of the other resistors therein.

17. The liquid crystal driver according to claim 11, wherein phase difference between the output signal of said periodic waveform generator and said phase shifter is changed around a center of +90° or −90°.

18. The liquid crystal driver according to claim 11, wherein said periodic waveform generator comprises a digital circuit which inverts bits in an output/input port periodically.

19. The liquid crystal driver according to claim 11, wherein said electrodes of the plurality of areas in said liquid crystal element extend as a plurality of concentric areas.

20. The liquid crystal driver according to claim 11, wherein each of said plurality of potential dividers has an output terminal in correspondence to a half to total resistance thereof, and the output terminals of said plurality of potential dividers are connected to each other.

* * * * *

UNITED STATES PATENT AND TRADEMARK OFFICE
CERTIFICATE OF CORRECTION

PATENT NO. : 6,661,415 B1
DATED : December 9, 2003
INVENTOR(S) : Katsuhiko Yasuda et al.

It is certified that error appears in the above-identified patent and that said Letters Patent is hereby corrected as shown below:

<u>Title page.</u>
Item [12], please change "Yasuda et al." to -- Wakabayashi et al. --
Item [75], Inventors, please remove the following:
-- Katsuhiko Yasuda, Neyagawa (JP);
  Hidenori Wada, Uji (JP);
  Daisuke Ogata, Amagaski (JP);
  Naoya Hotta, Sagamihara (JP); --

Signed and Sealed this

Twenty-seventh Day of April, 2004

JON W. DUDAS
*Acting Director of the United States Patent and Trademark Office*